US011536346B2

(12) United States Patent
Cho et al.

(10) Patent No.: US 11,536,346 B2
(45) Date of Patent: Dec. 27, 2022

(54) SHOCK ABSORBER

(71) Applicant: KYB Corporation, Tokyo (JP)

(72) Inventors: Gai Cho, Aichi (JP); Naoki Kubota, Gifu (JP); Masahiro Miwa, Gifu (JP)

(73) Assignee: KYB CORPORATION, Tokyo (JP)

( * ) Notice: Subject to any disclaimer, the term of this patent is extended or adjusted under 35 U.S.C. 154(b) by 211 days.

(21) Appl. No.: 16/976,695

(22) PCT Filed: Mar. 8, 2019

(86) PCT No.: PCT/JP2019/009395
§ 371 (c)(1),
(2) Date: Aug. 28, 2020

(87) PCT Pub. No.: WO2019/176784
PCT Pub. Date: Sep. 19, 2019

(65) Prior Publication Data
US 2021/0140507 A1    May 13, 2021

(30) Foreign Application Priority Data

Mar. 15, 2018  (JP) .............................. JP2018-048219
Mar. 15, 2018  (JP) .............................. JP2018-048220

(51) Int. Cl.
*F16F 9/36*    (2006.01)
*F16F 9/19*    (2006.01)
(Continued)

(52) U.S. Cl.
CPC ............... *F16F 9/362* (2013.01); *F16F 9/19* (2013.01); *F16F 9/585* (2013.01); *B60G 13/08* (2013.01);
(Continued)

(58) Field of Classification Search
CPC .... F16F 9/362; F16F 9/19; F16F 9/585; F16F 6/061; F16F 9/064; F16F 2222/12;
(Continued)

(56) References Cited

U.S. PATENT DOCUMENTS

| 4,482,036 | A | * | 11/1984 | Wossner | ................. | F16F 9/364 |
| | | | | | | 188/322.13 |
| 5,176,229 | A | * | 1/1993 | Kanari | .................... | F16F 9/364 |
| | | | | | | 188/315 |
| 5,178,243 | A | * | 1/1993 | Hamada | .................. | F16F 9/364 |
| | | | | | | 188/315 |
| 5,363,945 | A | * | 11/1994 | Lizell | ...................... | F16F 9/364 |
| | | | | | | 188/315 |

(Continued)

FOREIGN PATENT DOCUMENTS

| CN | 106460997 A | 2/2017 |
| CN | 107002808 A | 8/2017 |

(Continued)

*Primary Examiner* — Robert A. Siconolfi
*Assistant Examiner* — James K Hsiao
(74) *Attorney, Agent, or Firm* — Rabin & Berdo, P.C.

(57) ABSTRACT

A shock absorber includes a bearing unit having a bearing and a bearing holding member, and a seal unit having a seal member and a seal holding member. The seal holding member includes a seal accommodating portion being configured to accommodate the seal member, and an insertion hole through which a piston rod is inserted. The seal member is pressed against an outer circumferential surface of the piston rod and the seal accommodating portion by working-fluid pressure in the extension-side chamber. And the bearing is provided such that a first end surface of the bearing facing the seal member matches an aperture plane of a through hole of the bearing holding member or such that the first end surface of the bearing projects out from the aperture plane of the through hole.

8 Claims, 16 Drawing Sheets

(51) Int. Cl.
*F16F 9/06* (2006.01)
*B60G 13/08* (2006.01)
*F16F 9/58* (2006.01)

(52) U.S. Cl.
CPC ...... *B60G 2202/24* (2013.01); *B60G 2206/41* (2013.01); *B60G 2206/73* (2013.01); *B60G 2800/162* (2013.01); *F16F 9/061* (2013.01); *F16F 9/064* (2013.01); *F16F 2222/12* (2013.01); *F16F 2224/025* (2013.01); *F16F 2230/0052* (2013.01); *F16F 2230/30* (2013.01); *F16F 2232/08* (2013.01); *F16F 2234/02* (2013.01)

(58) Field of Classification Search
CPC ......... F16F 2224/025; F16F 2230/0052; F16F 2230/30; F16F 2232/08; F16F 2234/02; B60G 13/08; B60G 2202/24; B60G 2206/73; B60G 2206/41; B60G 2800/162
See application file for complete search history.

(56) References Cited

U.S. PATENT DOCUMENTS

| | | | | |
|---|---|---|---|---|
| 6,896,110 | B2 * | 5/2005 | Vanmechelen | F16J 15/56 |
| | | | | 277/384 |
| 7,793,584 | B2 * | 9/2010 | Murakami | F16F 9/364 |
| | | | | 92/168 |
| 2010/0116607 | A1 * | 5/2010 | Lun | F16F 9/362 |
| | | | | 188/267.2 |
| 2017/0108073 | A1 * | 4/2017 | Scaramozzino | F16J 15/56 |
| 2017/0138432 | A1 | 5/2017 | Takeuchi | |
| 2017/0350464 | A1 | 12/2017 | Kato et al. | |

FOREIGN PATENT DOCUMENTS

| | | |
|---|---|---|
| GB | 1421008 A | 1/1976 |
| JP | H09-329177 A | 12/1997 |
| JP | 2011-214639 A | 10/2011 |
| JP | 2015218817 A | 12/2015 |
| JP | 2016125513 A | 7/2016 |

* cited by examiner

SHOCK ABSORBER

TECHNICAL FIELD

The present invention relates to a shock absorber.

BACKGROUND ART

JP2011-214639A discloses a damper in which a rod guide and an oil seal is attached to an opening portion of a bottomed-cylindrical shaped cylinder. A bush serving as a sliding member is press-fitted into a guide bore formed in the rod guide, and a piston rod is inserted through the bush. An oil chamber is formed between the rod guide and the oil seal, and the oil chamber communicates with a cylinder-upper chamber via a passage penetrating through the rod guide in the axial direction.

SUMMARY OF INVENTION

In the damper described in JP2011-214639A, because a gap is formed in an upper end portion of the guide bore, extraneous matters tend to be accumulated between the bush and the oil seal. Thus, there is a risk in that the accumulated extraneous matters enter a gap between the oil seal and the piston rod, and a damage is caused on the oil seal.

In addition, in the damper described in JP2011-214639A, a gap is provided between the piston rod and a reinforcing member that holds the oil seal. There is a risk in that, if this gap is too large, a main seal of the oil seal enters the gap, thereby causing a damage on the oil seal.

An object of the present invention is to prevent a damage of a seal member.

According to one aspect of the present invention, a shock absorber includes a cylinder filled with working fluid; a piston provided in the cylinder in a freely slidable manner, the piston being configured to partition an interior of the cylinder into an extension-side chamber and a contraction-side chamber; a piston rod inserted into the cylinder so as to be able to move into and out of the cylinder, the piston rod being connected to the piston; a bearing unit having a bearing and a bearing holding member provided with a through hole into which the bearing is inserted, the bearing being configured such that the piston rod is brought into sliding contact with an inner circumference of the bearing; a seal unit having a seal member configured to prevent leakage of the working fluid by being brought into sliding contact with an outer circumference of the piston rod and a seal holding member configured to hold the seal member; and a pressure chamber provided between the seal unit and the bearing unit, wherein the bearing holding member is provided with a communicating passage, the communicating passage being configured to guide the working fluid in the extension-side chamber to the pressure chamber, the seal holding member has: a seal accommodating portion configured to accommodate the seal member; and an insertion hole through which the piston rod is inserted, the seal member is pressed against an outer circumferential surface of the piston rod and the seal accommodating portion by working-fluid pressure in the extension-side chamber guided to the pressure chamber, and the bearing is provided such that a first end surface of the bearing facing the seal member matches an aperture plane of the through hole of the bearing holding member or such that the first end surface of the bearing projects out from the aperture plane of the through hole.

DESCRIPTION OF EMBODIMENTS

<First Embodiment>

A shock absorber 10 according to a first embodiment of the present invention will be explained below with reference to the drawings. The shock absorber 10 according to the present embodiment is utilized in vehicles such as automobiles, etc. and is set as an upright shock absorber in which a cylinder 1 is linked to a running gear having a wheel and an axle and in which an end portion of a piston rod (hereinafter, simply referred to as "rod") 3 projecting out from the cylinder 1 is linked to a vehicle body frame. Therefore, when impact caused by bumps and dips on a road surface is input to the wheel, the cylinder 1 moves into and out of the rod 3, and thereby, the shock absorber 10 is extended/contracted.

The shock absorber 10 may also be utilized in the vehicles other than the automobiles, and the shock absorber 10 may also be set as an inverted shock absorber in which the cylinder 1 is linked to the vehicle body side and in which the rod 3 is linked to the wheel side. In the following description, the upright shock absorber 10 will be described as an example. And the vertical direction of the shock absorber 10 is defined by designating a tip end portion of the rod 3 linked to the vehicle body frame as an upper end portion of the shock absorber 10, and a tip end portion of the cylinder 1 linked to the running gear as a lower end portion of the shock absorber 10.

Figure 1:
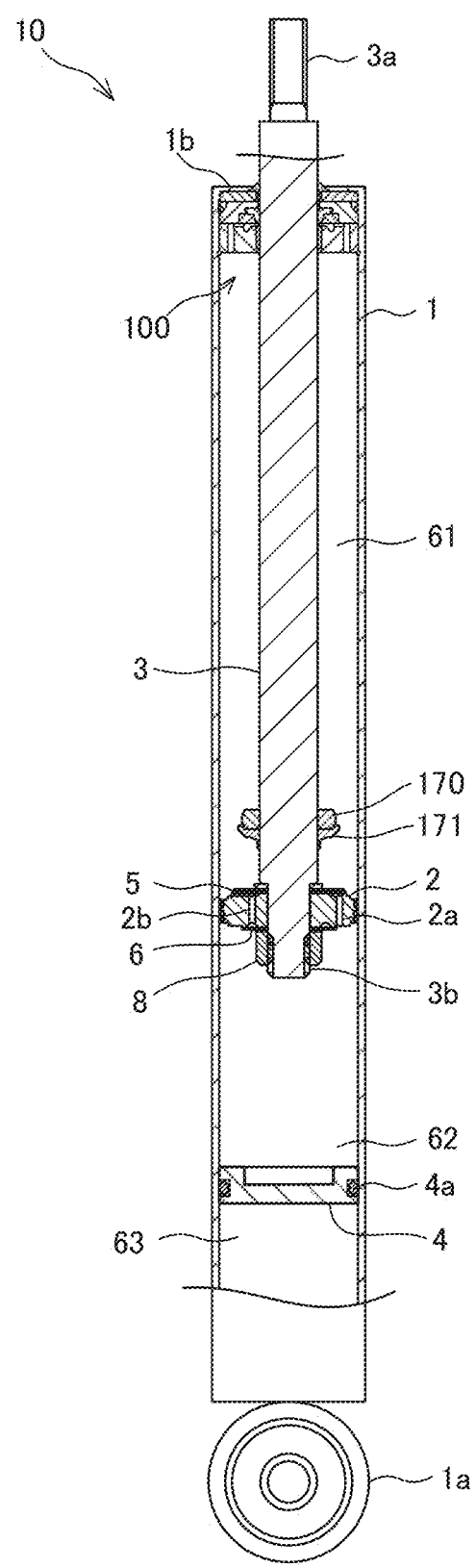
FIG. 1 is a sectional view of a shock absorber according to a first embodiment of the present invention.

The shock absorber 10 is a device that suppresses vibration of the vehicle body by generating damping force by being interposed between the vehicle body frame and the running gear. As shown in FIG. 1, the shock absorber 10 is provided with the cylinder 1, a rod guide assembly 100, the rod 3, and an annular piston 2. The cylinder 1 has a bottomed cylindrical shape. The rod guide assembly 100 is fixed to an upper opening portion of the cylinder 1. The rod 3 has a cylindrical column shape that is inserted into the cylinder 1 so as to be able to move into and out of the cylinder 1. And the annular piston 2 is connected to a lower end portion of the rod 3.

The piston 2 is provided in the cylinder 1 in a freely slidable manner and partitions an interior of the cylinder 1 into an extension-side chamber 61 and a contraction-side chamber 62. The extension-side chamber 61 is formed with an inner circumferential surface of the cylinder 1, an upper surface of the piston 2, and a lower surface of a rod guide 141, which will be described later (see FIG. 2). The contraction-side chamber 62 is formed with the inner circumferential surface of the cylinder 1, a lower surface of the piston 2, and an upper surface of a free piston 4, which will be described later. The rod 3 is supported by the rod guide assembly 100 in a freely slidable manner. The extension-side chamber 61 and the contraction-side chamber 62 are liquid chambers (operation chambers) into which working oil serving as working fluid is charged.

The shock absorber 10 is a mono-tube shock absorber provided with the free piston 4 that is inserted into the cylinder 1 in a freely slidable manner and that defines a gas chamber 63. A seal member 4a that maintains the airtightness of the gas chamber 63 is provided on an outer circumference of the free piston 4.

A lower end portion of the cylinder 1 on the side of the gas chamber 63 is closed. A linking member 1a for attaching the shock absorber 10 to the vehicle is provided on the lower end portion of the cylinder 1.

As the shock absorber 10 is contracted and the rod 3 moves into the cylinder 1, the free piston 4 is moved towards the gas chamber 63 side, and gas in the gas chamber 63 is compressed by an amount corresponding to the volume of the rod 3 that has moved in. As the shock absorber 10 is extended and the rod 3 moves out from the cylinder 1, the free piston 4 is moved towards the contraction-side chamber 62 side, and the gas in the gas chamber 63 is expanded by an amount corresponding to the volume of the rod 3 that has moved out. Thus, the volume change in the cylinder 1 when the shock absorber 10 is operated is compensated for.

An upper end portion of the rod 3 extends out from the cylinder 1, and a lower end portion thereof is inserted into the cylinder 1. A male screw 3a for attaching the shock absorber 10 to the vehicle is formed on the upper end portion of the rod 3, and a male screw 3b with which a nut 8 is threaded is formed on the lower end portion of the rod 3.

The piston 2 has passages 2a and 2b through which the extension-side chamber 61 and the contraction-side chamber 62 are communicated. A damping valve 5 having a plurality of annular leaf valves is provided on the extension-side chamber 61 side of the piston 2. A damping valve 6 having a plurality of annular leaf valves is provided on the contraction-side chamber 62 side of the piston 2. The piston 2, the damping valve 5, and the damping valve 6 are fixed to an end portion of the rod 3 by the nut 8.

The damping valve 5 opens the passages 2a by being opened by a differential pressure between the extension-side chamber 61 and the contraction-side chamber 62 when the shock absorber 10 is contracted, and imparts resistance to a flow of the working oil flowing from the contraction-side chamber 62 to the extension-side chamber 61 through the passages 2a. The damping valve 5 closes the passages 2a by being closed when the shock absorber 10 is extended. In other words, the damping valve 5 is a damping-force generating element that generates the damping force when the shock absorber 10 is contracted.

The damping valve 6 opens the passages 2b by being opened when the shock absorber 10 is extended and imparts resistance to the flow of the working oil flowing from the extension-side chamber 61 to the contraction-side chamber 62 through the passages 2b. The damping valve 6 closes the passages 2b by being closed when the shock absorber 10 is contracted. In other words, the damping valve 6 is the damping-force generating element that generates the damping force when the shock absorber 10 is extended.

Figure 2:
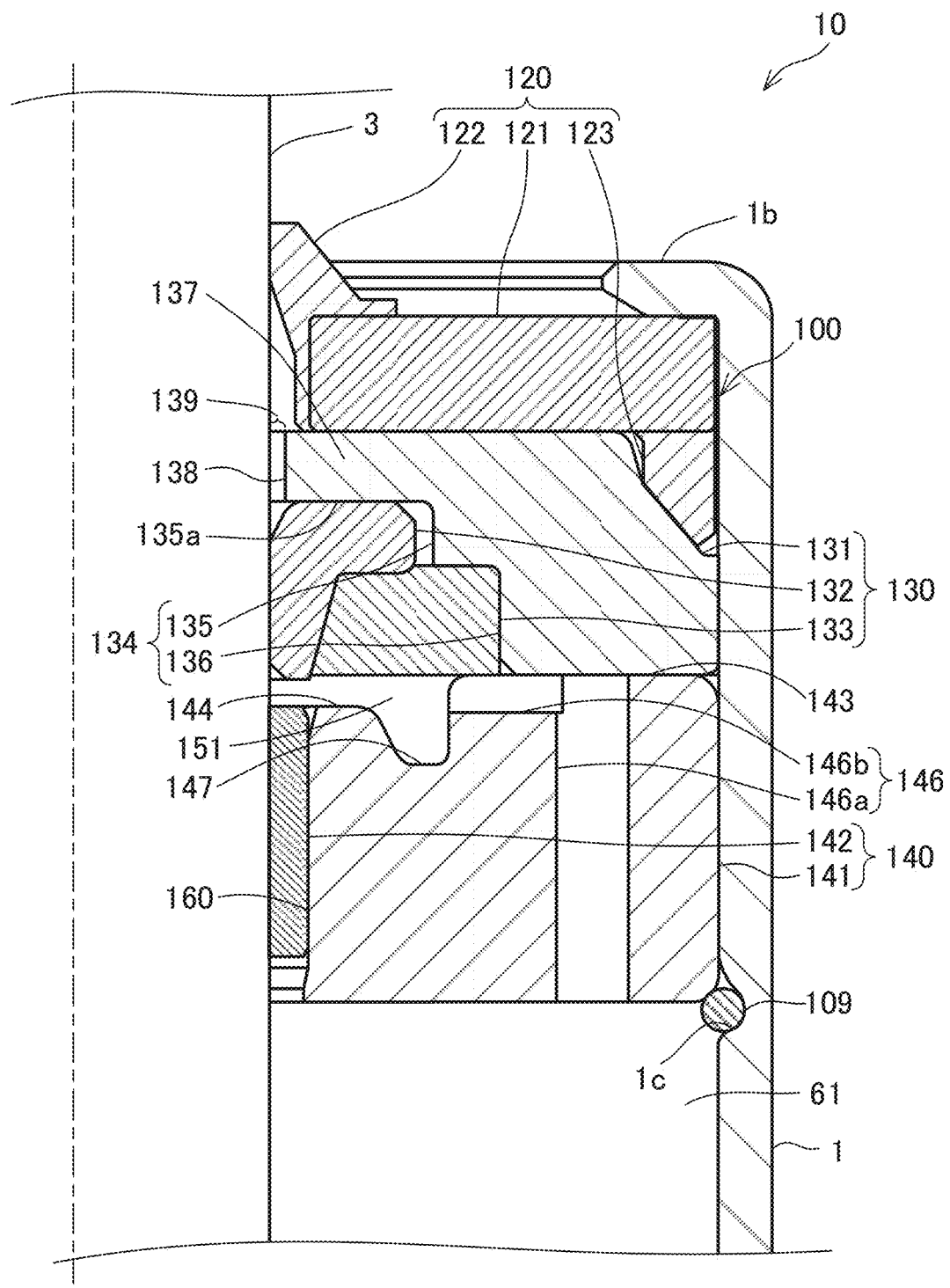
FIG. 2 is an enlarged sectional view showing a rod guide assembly in the shock absorber according to the first embodiment of the present invention.

As shown in FIG. 2, the rod guide assembly 100 has a dust seal unit 120, an oil seal unit 130, and a bearing unit 140. The dust seal unit 120 serving as a seal unit has a dust seal 122. The oil seal unit 130 serving as the seal unit has an oil seal 132. And the bearing unit 140 bears the rod 3 so as to be freely movable in the axial direction. In the above-described configuration, the axial direction means the direction along the center axis of the rod 3, in other words the direction in which the rod 3 moves.

In an inner circumference of the cylinder 1, an annular groove 1c extending in the circumferential direction is formed, and a retaining ring (spring pin) 109 serving as engaging means, which is provided separately from the cylinder 1, is fitted into the groove 1c. The retaining ring 109 is an annular member having a circular cross-section, and is a position defining part that defines the position of the bearing unit 140 in the axial direction by engaging with the bearing unit 140. Above the retaining ring 109 projecting out from the inner circumferential surface of the cylinder 1, the bearing unit 140, the oil seal unit 130, and the dust seal unit 120 are stacked in this order, and a caulked portion 1b is formed by caulking an upper end portion of the cylinder 1 towards the inside. By doing so, the bearing unit 140, the oil seal unit 130, and the dust seal unit 120 are fixed by the upper opening portion of the cylinder 1 in a stacked state between the caulked portion 1b and the retaining ring 109.

The bearing unit 140 has a bush 142 having an inner circumferential surface that is in sliding contact with an outer circumferential surface of the rod 3 and the rod guide 141 serving as a bearing holding member that holds the bush 142. The rod guide 141 has a through hole 160 into which the bush 142 is inserted. The bush 142 is a bearing that is formed by coating resin such as polytetrafluoroethylene (PTFE), etc. on the inner circumferential surface of a metal made cylindrical part (a base metal part) having a cylindrical shape. The bush 142 is fixed to the through hole 160 provided in the rod guide 141 by being press-fitted.

The dust seal unit 120 has a metal insert member 121 and a rubber made rubber member that covers the insert member 121, and this rubber member has the dust seal 122 and an outer circumferential seal 123. The dust seal 122 prevents entry of extraneous matters, such as dirt, rain water, and so forth, into the cylinder 1 by being brought into sliding contact with the outer circumferential surface of the rod 3. The outer circumferential seal 123 is bought into contact with the inner circumferential surface of the cylinder 1 so as to prevent leakage of the working oil in the cylinder 1 to the outside through an outer circumference of the rod guide assembly 100. The dust seal 122 and the outer circumferential seal 123 are connected by a connecting rubber portion (not shown).

The oil seal unit 130 has the oil seal 132, a seal holder 133, and a seal housing 131. The oil seal 132 serving as a seal member prevents the leakage of the working oil in the cylinder 1 to the outside through the outer circumference of the rod 3 by being brought into sliding contact with the outer circumferential surface of the rod 3. The seal holder 133 serving as the seal member holds the oil seal 132 by being provided on the outer side of the oil seal 132 in the radial direction. And the seal housing 131 serving as a seal holding member holds the oil seal 132 and the seal holder 133.

The metal seal housing 131 is provided with a seal accommodating concave portion 134 that is a seal accommodating portion having a concave shape that accommodates the oil seal 132 and the seal holder 133. The seal accommodating concave portion 134 has a small diameter concave portion 135 and a large diameter concave portion 136 having larger inner diameter than the small diameter concave portion 135, and thereby, the seal accommodating concave portion 134 has a stepped shape in which a lower end surface (the end surface on the bearing unit 140 side) is opened. The seal holder 133 is held in a state being brought into contact with the rod guide 141 and a bottom and side surfaces of the large diameter concave portion 136. The oil seal 132 is held by the seal holder 133 in a state being pressed against a bottom surface 135a of the small diameter concave portion 135 and the outer circumferential surface of the rod 3.

The seal housing 131 is formed with a support portion 137 that supports, in the axial direction, the oil seal 132 that is pressed upwards by the working oil pressure that has been guided to an oil chamber 151, which will be described below. In other words, a lower end surface of the support portion 137 (the end surface on the bearing unit 140 side) corresponds to the bottom surface 135a of the above-described small diameter concave portion 135. The support portion 137 is formed with an insertion hole 138 into which the rod 3 is inserted. The insertion hole 138 is a through hole penetrating from the bottom surface 135a of the small diameter concave portion 135 to an upper end surface of the seal housing 131 in the axial direction. An annular gap 139 is formed between an inner circumferential surface of the insertion hole 138 and the outer circumferential surface of the rod 3.

The annular oil seal 132 is inserted into the small diameter concave portion 135, and the annular seal holder 133 is press-fitted into the large diameter concave portion 136. The oil seal 132 is formed of an elastic member such as fluoro-rubber, etc. The seal holder 133 is formed of the elastic member such as nitrile rubber, etc.

The rod guide 141 is arranged on the retaining ring 109 so as to define the extension-side chamber 61 and to support the oil seal unit 130 from below. In other words, the bearing unit 140 not only supports the rod 3 in the axial direction in a freely slidable manner, but also functions as a support member supporting the seal housing 131 of the oil seal unit 130. On an end surface on the opposite side from the extension-side chamber 61 (the end surface on the oil seal unit 130 side), the rod guide 141 has a contact portion 143 that is in contact with the seal holder 133 and a non-contact portion 144 that is separated from the seal holder 133.

The contact portion 143 is in contact with the seal housing 131 and an outer circumferential portion of the seal holder 133. The non-contact portion 144 is separated from an inner circumferential portion of the seal holder 133 in the axial direction. The oil chamber 151 is provided between the oil seal unit 130 and the bearing unit 140. The oil chamber 151 is defined as a substantially annular pressure chamber by the rod guide 141, the lower end surface of the oil seal unit 130, and the outer circumferential surface of the rod 3. The oil chamber 151 is formed with an annular groove 147 that is depressed in the axial direction. The annular groove 147 is a concave portion into which the extraneous matters (contaminants) in the oil chamber 151 are collected intentionally, and the annular groove 147 suppresses accumulation of the extraneous matters around the rod 3.

The rod guide 141 is formed with communicating passages 146 through which the oil chamber 151 and the extension-side chamber 61 are communicated. The communicating passages 146 are each formed with a penetrating passage 146a that penetrates through the rod guide 141 in the axial direction and a radial direction passage 146b that is formed in an end surface of the rod guide 141 facing the seal housing 131 so as to extend in the radial direction. The communicating passages 146 transmit the pressure on the extension-side chamber 61 side to the seal holder 133 and the oil seal 132 by guiding the working oil in the extension-side chamber 61 to the oil chamber 151.

The working oil pressure from the extension-side chamber 61 that has been guided to the oil chamber 151 is exerted on an end surface of the seal holder 133, and thereby, the seal holder 133 is compressed in the axial direction and protrudes out in the radial direction. Therefore, the oil seal 132 is pressed against the outer circumferential surface of the rod 3 and the bottom surface 135a of the small diameter concave portion 135. As a result, the outer circumferential surface of the rod 3 is sealed by the oil seal 132. Because the oil seal 132 is supported in the axial direction by the bottom surface 135a of the small diameter concave portion 135 (the lower end surface of the support portion 137), the oil seal 132 is pressed against the rod 3 without being displaced. Therefore, it is possible to improve the seal performance for the shock absorber 10.

Figure 3:
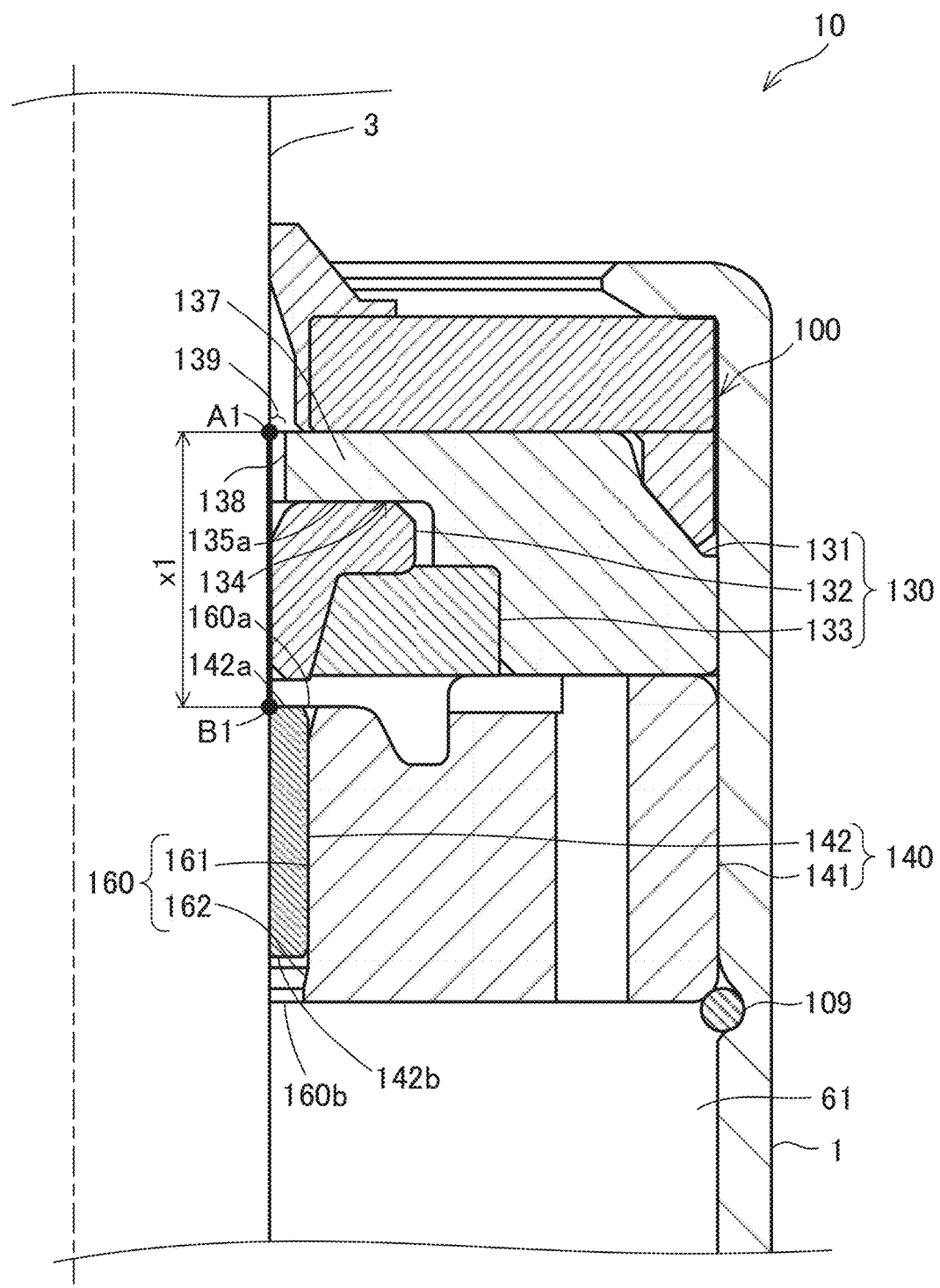
FIG. 3 is a diagram showing a positional relationship between a bush and a gap between a piston rod and a seal housing in the shock absorber according to the first embodiment of the present invention.

As shown in FIG. 3, the rod guide 141 is provided with the through hole 160 into which the bush 142 is press-fitted. The through hole 160 has a large-diameter portion 161 into which the bush 142 is inserted and a small-diameter portion 162 that is provided below the large-diameter portion 161 so as to be continuous therewith. The small-diameter portion 162 has a tapered portion the inner diameter of which is gradually decreased downwards and a straight portion that extends downwards from a lower end of the tapered portion. In the straight portion, the inner diameter is constant regardless of positions in the axial direction.

The bush 142 is provided such that an upper end surface 142a that is a first end surface in the axial direction of the bush 142 facing the oil seal 132 in the axial direction matches an upper aperture plane 160a that is an aperture plane of the through hole 160 of the rod guide 141 on the first end side in the axial direction. A separation distance between the upper end surface 142a of the bush 142 and a lower end surface of the oil seal 132 is set to the dimension at which the oil seal 132 and the bush 142 do not come into contact with each other during the operation of the shock absorber 10.

Figure 4:
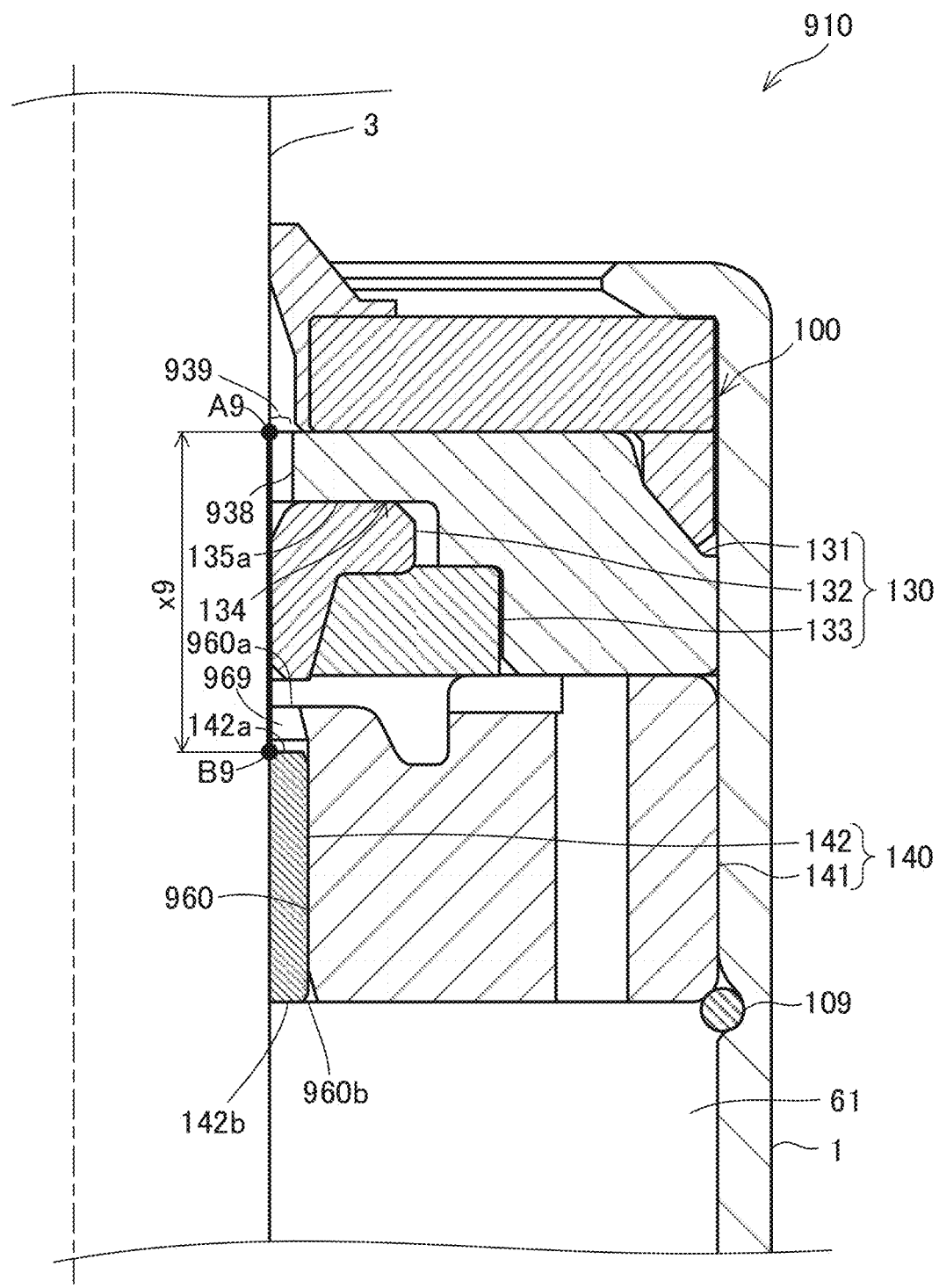
FIG. 4 is a diagram showing the positional relationship between the bush and the gap between the piston rod and the seal housing in the shock absorber according to a comparative example of the first embodiment.

Operational advantages of the present embodiment achieved by employing such a configuration will be specifically explained by comparison with a shock absorber 910 according to a comparative example of the present embodiment shown in FIG. 4.

As shown in FIG. 4, in the comparative example of the present embodiment, the bush 142 is provided such that a lower end surface 142b that is a second end surface of the bush 142 in the axial direction matches a lower aperture plane 960b that is an aperture plane of a through hole 960 of the rod guide 141 on the second end side in the axial direction. In other words, in the comparative example of the present embodiment, the bush 142 is arranged such that the upper end surface 142a of the bush 142 is positioned below an upper aperture plane 960a of the through hole 960, in other words, the upper end surface 142a is positioned inside the through hole 960.

As described above, in the comparative example of the present embodiment, in an upper part of the through hole 960 (the upper end surface 142a side of the bush 142), a gap 969 is formed between the outer circumferential surface of the rod 3 and an inner circumferential surface of the through hole 960. In other words, because an annular concave portion is formed around the rod 3, the extraneous matters tend to accumulate between the bush 142 and the oil seal 132. When the shock absorber 10 is extended at which the rod 3 moves out from the cylinder 1, the working oil enters between the oil seal 132 and the rod 3 by being dragged by the rod 3 due to its viscous drag. Therefore, in the comparative example of the present embodiment, there is a risk in that the extraneous matters that have been accumulated around the rod 3 enter between the oil seal 132 and the rod 3 together with the working oil, and the oil seal 132 is damaged.

In contrast, in the present embodiment, as shown in FIG. 3, in an upper part of the through hole 160 (the upper end surface 142a side of the bush 142), a gap is not formed between the outer circumferential surface of the rod 3 and an inner circumferential surface of the through hole 160. Therefore, in the present embodiment, it is possible to suppress accumulation of the extraneous matters between the bush 142 and the oil seal 132. As a result, it is possible to prevent the oil seal 132 from being damaged.

Furthermore, in the present embodiment, compared with the comparative example, it is possible to cause the upper end surface 142a of the bush 142 to be positioned closer to the gap 139 between the outer circumferential surface of the rod 3 and the inner circumferential surface of the insertion hole 138. Specifically, the axial direction distance x1 between an upper end A1 of the gap 139 and an upper end B1 of the bush 142 in the present embodiment shown in FIG. 3 is shorter than the axial direction distance x9 between an upper end A9 of a gap 939 and an upper end B9 of the bush 142 in the comparative example shown in FIG. 4 (x1<x9).

As shown in FIG. 4, in the comparative example of the present embodiment, in a case in which a lateral force is exerted to the rod 3 and the rod 3 is deflected about the upper end B9 of the bush 142 as the fixed fulcrum, the deflected amount of the rod 3 at the upper end A9 of the gap 939 (a deformation amount in the radial direction) is larger than that in the present embodiment. When the rod 3 interferes with the seal housing 131, noise and abrasion is caused. Therefore, in the comparative example of the present embodiment, in order to avoid the interference between the rod 3 and the seal housing 131, it is required to set the inner diameter of an insertion hole 938 so as to be larger than the inner diameter of the insertion hole 138 in the present embodiment. However, the oil seal 132 is pressed against the bottom surface 135a of the seal accommodating concave portion 134 by the working oil pressure. Therefore, when the gap 939 between an inner circumferential surface of the insertion hole 938 and the outer circumferential surface of the rod 3 is too large, there is a risk in that the oil seal 132 enters the gap 939 and a damage is caused on the oil seal 132.

In contrast, in the present embodiment, as described above, the bush 142 is arranged in the upper part in the through hole 160, and the axial direction distance x1 shown in FIG. 3 is set so as to be shorter than the axial direction distance x9 in the comparative example (see FIG. 4). Therefore, in the present embodiment, when the rod 3 is deflected about the upper end B1 of the bush 142 as the fixed fulcrum, the deflected amount of the rod 3 at the upper end A1 of the gap 139 becomes smaller than that in the comparative example. Therefore, in the present embodiment, the inner diameter of the insertion hole 138 formed in the support portion 137 can be set so as to be smaller than the inner diameter of the insertion hole 938 in the comparative example. As a result, the gap 139 in the present embodiment becomes smaller than the gap 939 in the comparative example. As a result, in the present embodiment, the oil seal 132 is prevented from entering the gap 139 between the inner circumferential surface of the insertion hole 138 and the outer circumferential surface of the rod 3, and therefore, it is possible to prevent the oil seal 132 from being damaged.

The bush 142 is inserted inside the through hole 160 from the upper aperture plane 160a. Because the inner diameter of the small-diameter portion 162 is smaller than the inner diameter of the large-diameter portion 161 and the outer diameter of the bush 142, when the bush 142 is inserted into the through hole 160, the bush 142 does not slip out from the through hole 160.

As shown in FIG. 1, an annular stopper 171 is fixed at a position separated upwards from the piston 2 of the rod 3 by a predetermined distance. The stopper 171 supports an annular rebound cushion 170. The rebound cushion 170 is formed of an elastically deformable elastic member, such as rubber, etc., and is provided on the outer circumference of the rod 3. The rebound cushion 170 is elastically deformed by coming into contact with the rod guide 141 when the shock absorber 10 is in a most-extended state (see FIG. 2), and thereby, the rebound cushion 170 alleviates the impact applied to the shock absorber 10 at the most-extended state by being elastically deformed.

When the rebound cushion 170 is elastically deformed by coming into contact with the rod guide 141 shown in FIG. 2, a part of the rebound cushion 170 may enter the inside the through hole 160.

In the present embodiment, as shown in FIG. 3, the lower end surface 142b of the bush 142 is positioned above a lower aperture plane 160b, in other words, inside the through hole 160 in the axial direction. The distance between the lower end surface 142b of the bush 142 and the lower aperture plane 160b of the through hole 160 is set to the distance at which the rebound cushion 170 does not come into contact with the bush 142 when the rod 3 is in the most-extended state. In other words, in the present embodiment, it is possible to prevent the bush 142 from being pushed upwards (in other words, pushed towards the oil seal 132) by the contact between the rebound cushion 170 and the bush 142 when the rod 3 is in the most-extended state.

Furthermore, in the present embodiment, on the side towards the rebound cushion 170 (the lower side) relative to the large-diameter portion 161 into which the bush 142 is inserted, the small-diameter portion 162 having the smaller inner diameter than the large-diameter portion 161 is provided. In other words, the small-diameter portion 162 having the inner diameter smaller than the outer diameter of the bush 142 is provided between the lower end surface 142b of the bush 142 and the lower aperture plane 160b of the through hole 160. Because the amount by which the rebound cushion 170 enters the through hole 160 is suppressed by the small-diameter portion 162, it is possible to effectively prevent the rebound cushion 170 from coming into contact with the bush 142. In addition, with such a configuration, it is possible to reduce the distance between the lower end surface 142b of the bush 142 and the lower aperture plane 160b of the through hole 160. In other words, according to the present embodiment, compared with the case in which the small-diameter portion 162 is not provided, it is possible to set the axial length of the bush 142 so as to be longer and to suppress the eccentricity of the rod 3.

According to the first embodiment described above, following operational advantages are afforded.

Because the bush 142 is provided such that the upper end surface 142a thereof matches the upper aperture plane 160a of the through hole 160 of the rod guide 141, a gap is not formed between the inner circumferential surface of the through hole 160 of the rod guide 141 and the outer circumferential surface of the rod 3 on the side of the upper end surface 142a of the bush 142. Because the gap is not formed in the upper part in the through hole 160, the accumulation of the extraneous matters between the bush 142 and the oil seal 132 is suppressed. Therefore, it is possible to prevent the oil seal 132 from being damaged by the contact between the oil seal 132 and the extraneous matters that have been accumulated between the bush 142 and the oil seal 132.

Furthermore, because the deflection of the rod 3 about the upper end B1 of the bush 142 as the fixed fulcrum is suppressed, it is possible to set the gap 139 between the inner circumferential surface of the insertion hole 138 of the seal housing 131 and the outer circumferential surface of the rod 3 so as to be smaller. By doing so, it is possible to prevent the damage of the oil seal 132 caused by the entry of the oil seal 132 into the gap 139 between the seal housing 131 and the rod 3.

<Second Embodiment>

Figure 5:
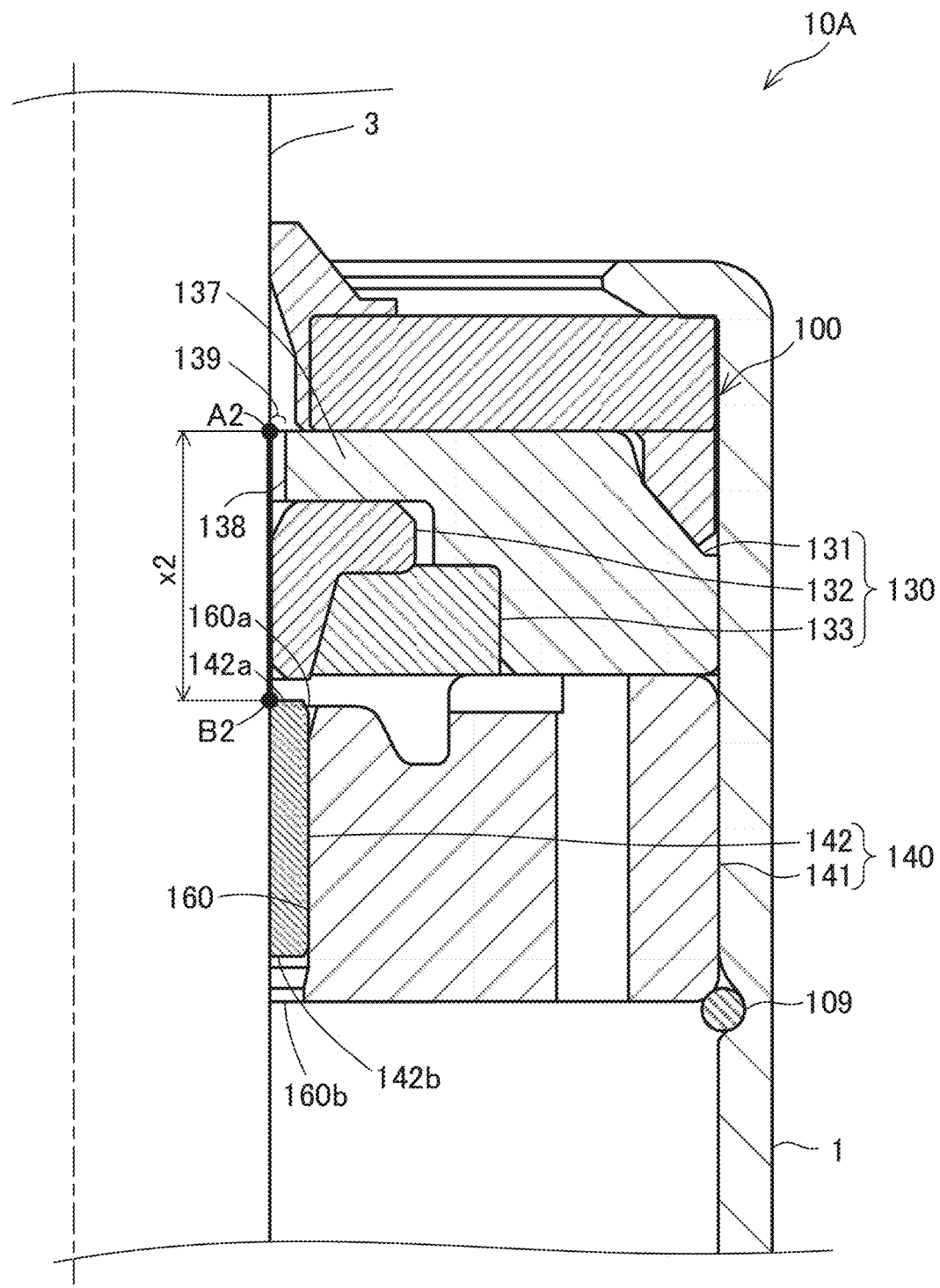
FIG. 5 is an enlarged sectional view showing the rod guide assembly in the shock absorber according to a second embodiment of the present invention.

A shock absorber 10A according to a second embodiment of the present invention will be described with reference to FIG. 5. In the following, differences from the above-described first embodiment will be mainly described, and in the figures, components that are the same as or correspond to the components described in the above-described first embodiment are assigned the same reference numerals and description thereof will be omitted.

In the first embodiment, the position of the bush 142 is set such that the upper end surface 142a of the bush 142 matches the upper aperture plane 160a of the through hole 160 of the rod guide 141. In contrast, in the second embodiment, the position of the bush 142 is set such that the upper end surface 142a of the bush 142 projects out from the upper aperture plane 160a of the through hole 160 of the rod guide 141. In other words, the upper end surface 142a of the bush 142 is positioned above the upper aperture plane 160a of the through hole 160, in other words, at outside the through hole 160. A projecting amount (projecting height) of the bush 142 is set to the dimension at which the oil seal 132 does not come into contact with the bush 142 during the operation of the shock absorber 10A.

As described above, in the second embodiment, because the upper end portion of the bush 142 is provided so as to project from the through hole 160 towards the oil seal 132, the gap is not formed between the inner circumferential surface of the through hole 160 of the rod guide 141 and the outer circumferential surface of the rod 3 on the side of the upper end surface 142a of the bush 142. Because the gap is not formed in the upper part in the through hole 160, similarly to the first embodiment, the accumulation of the extraneous matters between the bush 142 and the oil seal 132 is suppressed, and thereby, the damage of the oil seal 132 is prevented.

Furthermore, the axial direction distance x2 between an upper end B2 of the bush 142 and an upper end A2 of the gap 139, which is formed between the inner circumferential surface of the insertion hole 138 of the seal housing 131 and the outer circumferential surface of the rod 3, is smaller than the axial direction distance x1 in the first embodiment (see FIG. 3) (x2<x1). Therefore, in the second embodiment, it is possible to set the gap 139 between the seal housing 131 and the rod 3 so as to be smaller than that in the first embodiment. By doing so, it is possible to prevent the damage of the oil seal 132 due to the entry of the oil seal 132 into the gap 139 between the seal housing 131 and the rod 3 more effectively than in the first embodiment.

<Third Embodiment>

A shock absorber 10B according to third embodiment of the present invention will be described with reference to FIGS. 6 to 11. In the following, differences from the above-described first embodiment will be mainly described, and in the figures, components that are the same as or correspond to the components described in the above-described first embodiment are assigned the same reference numerals and description thereof will be omitted.

Figure 6:
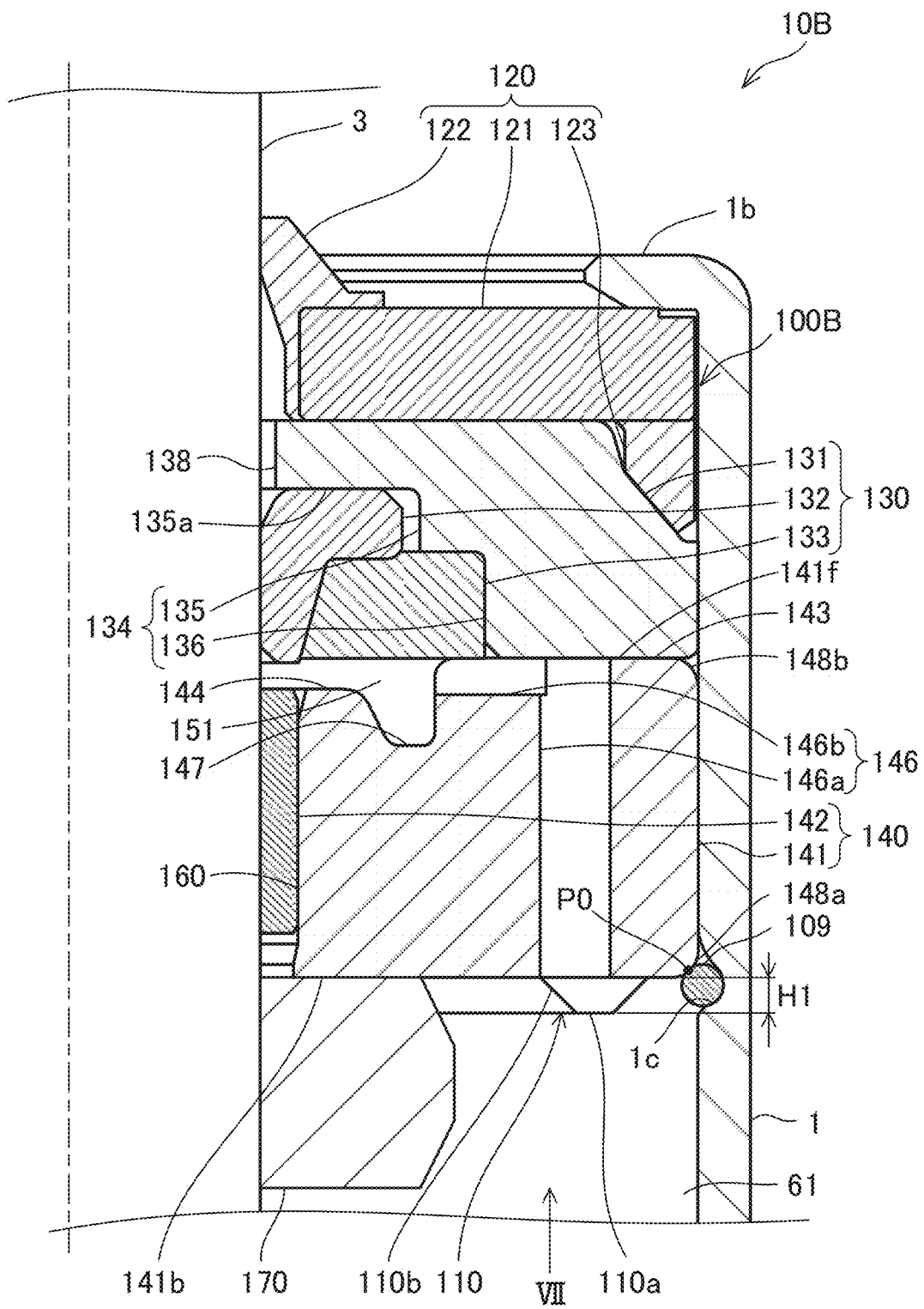
FIG. 6 is an enlarged sectional view showing the rod guide assembly in the shock absorber according to a third embodiment of the present invention, and the cross-section of a rod guide shows a cross-section taken along a line VI-VI in FIG. 7.
Figure 7:
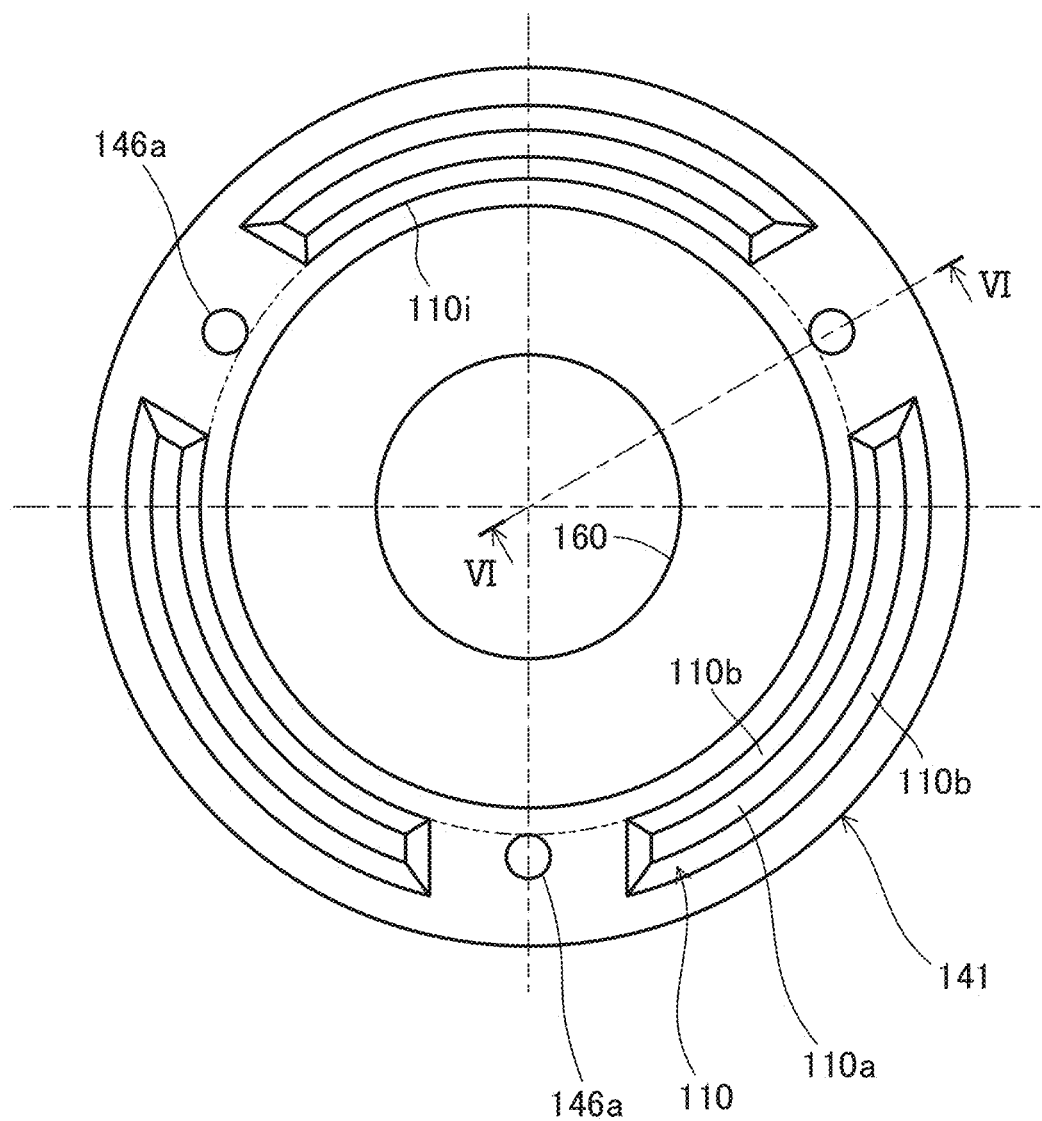
FIG. 7 is a rear view of the rod guide viewed from the VII direction in FIG. 6.

As shown in FIGS. 6 and 7, the rod guide 141 is an annular-shaped member. In the following, the front side and the back side of the rod guide 141 are defined by designating an upper surface as a front surface 141f and a lower surface as a back surface 141b in a state in which a rod guide assembly 100B has been assembled suitably as shown in FIG. 6.

For the rod guide 141, the orientation in which the front surface 141f faces the upper side and the back surface 141b faces the lower side is designated as the correct orientation, and in contrast, the orientation in which the front surface 141f faces the lower side and the back surface 141b faces the upper side is designated as the incorrect orientation. Because the rod guide 141 is the annular-shaped member, the rod guide 141 can be inserted into the cylinder 1 even in an orientation in which its front side and back side are inverted. Therefore, when the rod guide assembly 100B is assembled, there is a risk in that a misassembly, in which the caulking process of the cylinder upper end portion is performed with the rod guide 141 arranged in the inverted orientation by mistake, is caused.

Thus, in the third embodiment, in order to prevent occurrence of the misassembly, the rod guide 141 is formed such that, in a case in which the rod guide 141 is inserted into the cylinder 1 in the incorrect orientation, a projected margin X for caulking the upper end portion of the cylinder 1 becomes shorter compared with a case in which the rod guide 141 is inserted into the cylinder 1 in the correct orientation. With such a configuration, it is possible to perform determination of the occurrence of the misassembly by measuring the projected margin X in a pre-step prior to the caulking process of the cylinder upper end portion. The detail of the embodiment will be described below.

As shown in FIG. 6, an outer corner portion 148a of the rod guide 141 comes into contact with the retaining ring 109, and thereby, the rod guide 141 is supported by the retaining ring 109. The rod guide 141 according to the third embodiment has a plurality of protruded portions 110 that protrude from the back surface 141b facing the extension-side chamber 61 towards the extension-side chamber 61 (the lower side) when the rod guide 141 is inserted into the cylinder 1 such that the front side and the back side thereof are oriented correctly.

As shown in FIGS. 6 and 7, the plurality of protruded portions 110 are arranged at equal intervals along the circumferential direction. Each of the protruded portions 110 is formed so as to have an arc shape centered at the center axis of the rod 3 when viewed in a planar view. Each of the protruded portions 110 has a trapezoidal cross-section and is formed such that the width (the dimension between side surfaces 110b on both sides) is reduced from a base end thereof to a tip end surface 110a. The tip end surface 110a forms a flat surface orthogonal to the center axis of the rod 3, and a pair of side surfaces 110b on both side form tapered surfaces that are inclined from the tip end surface 110a towards the base end such that the width of the protruded portion 110 is widened.

Figure 8:
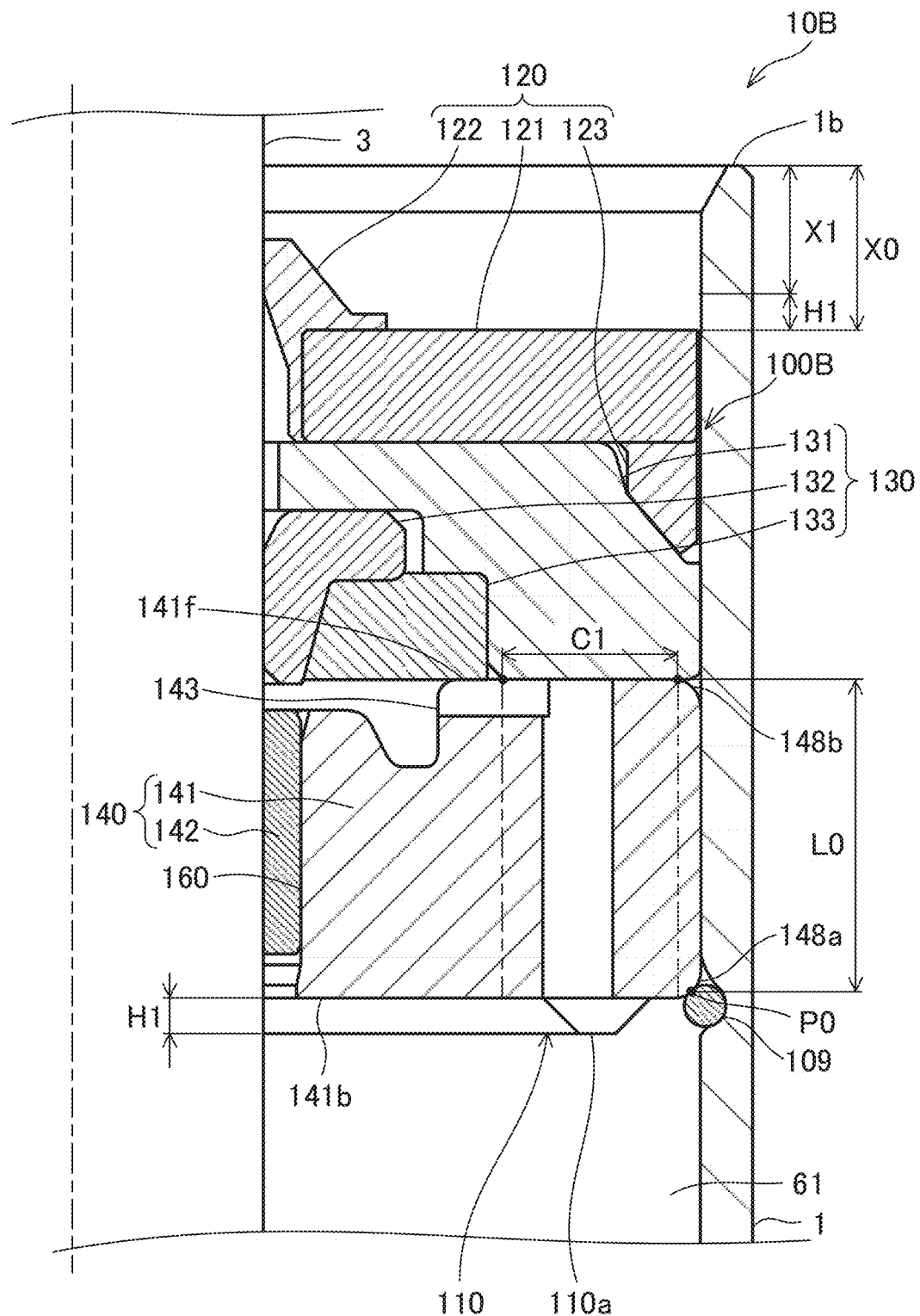
FIG. 8 is a sectional view showing a state in which a bearing unit in the shock absorber according to the third embodiment of the present invention is arranged in a correct orientation.
Figure 9:
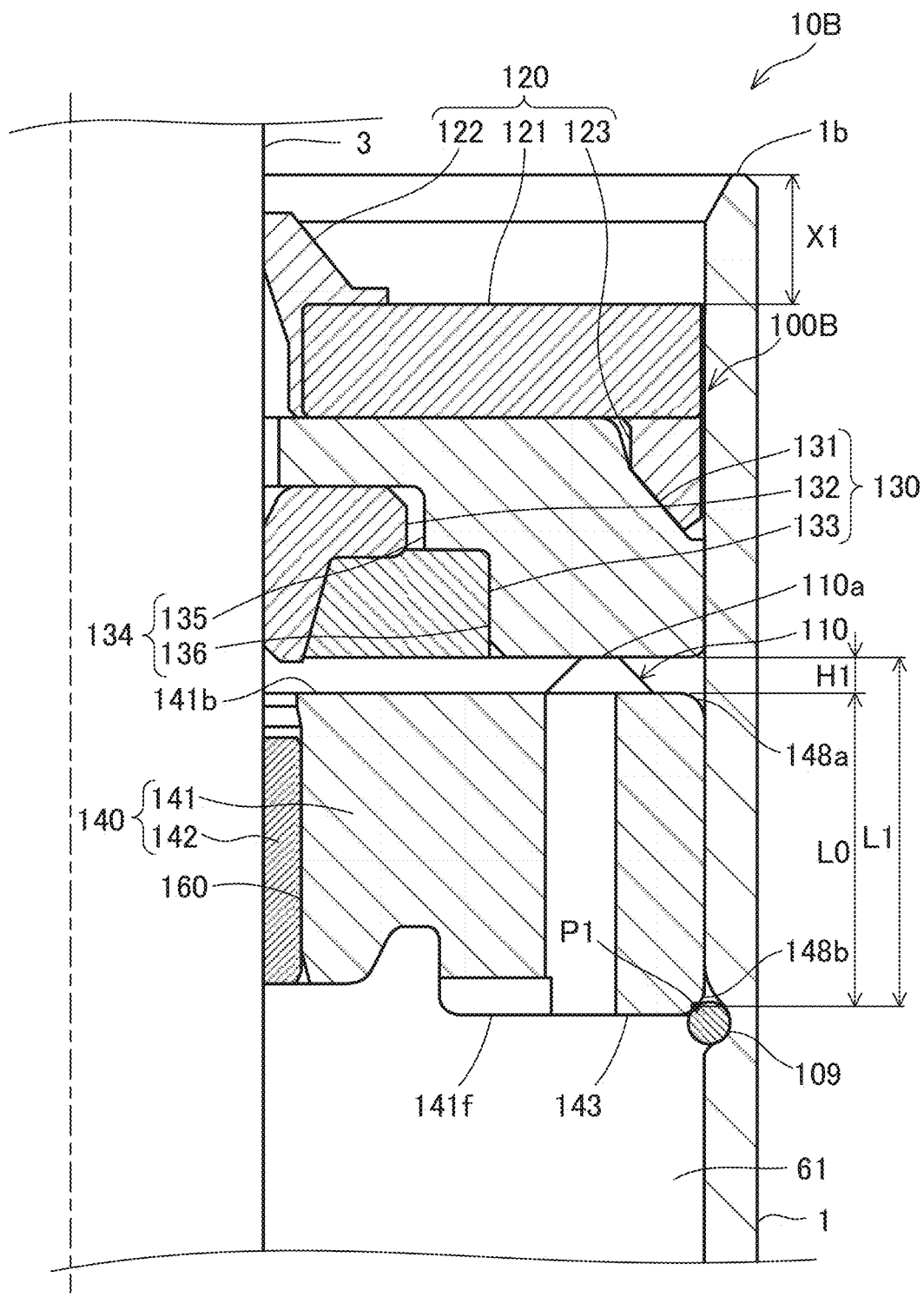
FIG. 9 is a sectional view showing a state in which the bearing unit in the shock absorber according to the third embodiment of the present invention is arranged in an incorrect orientation.

FIG. 8 is a sectional view showing a state in which the bearing unit 140 in the shock absorber 10B is arranged in the correct orientation, and FIG. 9 is a sectional view showing a state in which the bearing unit 140 in the shock absorber 10B is arranged in the incorrect orientation.

As shown in FIG. 8, in a case in which the bearing unit 140 is arranged on the retaining ring 109 in the correct orientation, a contact region C1 is defined as an annular-shaped plane on the rod guide 141 at which the rod guide 141 comes into contact with the seal housing 131. The protruded portions 110 are each formed such that the tip end surface 110a thereof is located radially inside (the center side) of a contacting portion P0 at which the rod guide 141 comes into contact with the retaining ring 109, and radially outside of an inner circumference of the annular-shaped contact region C1. In other words, when viewed from the axial direction, the protruded portions 110 are formed such that the tip end surfaces 110a are positioned within the annular-shaped contact region C1.

With such a configuration, as shown in FIG. 9, in a case in which the bearing unit 140 is assembled into the cylinder 1 in the incorrect orientation, the tip end surfaces 110a of the protruded portions 110 come into contact with the seal housing 131. Therefore, when compared with the case in which the bearing unit 140 is arranged in the correct orientation, the projected margin X becomes shorter.

In the above-described configuration, when viewed from the axial direction, in the protruded portions 110, as long as the tip end surfaces 110a of the protruded portions 110 are each partially overlapped with the annular-shaped contact region C1, it is possible to allow a part of each of the tip end surfaces 110a of the protruded portions 110 to come into contact with the seal housing 131 when the bearing unit 140 is arranged in the incorrect orientation. In other words, it suffices to form the protruded portions 110 such that the tip end surfaces 110a are each partially positioned radially outside of the inner circumference of the annular-shaped contact region C1.

In a state in which a plurality of parts are stacked on the retaining ring 109 prior to the caulking process of the upper end portion of the cylinder 1, small gaps are respectively formed between the stacked parts. Therefore, for example, the larger the sum total of the total of the tolerances of the respective parts to be stacked and the total of the sizes of the gaps between the respective parts stacked is, the smaller the projected margin X for caulking the upper end portion of the cylinder 1 becomes. In other words, the projected margin X of the cylinder end portion is changed depending on the sum total of the total of the tolerances of the respective parts and the total of the sizes of the gaps between the respective parts.

In the conventional shock absorber, the diameter of a cross-section of a retaining ring may become smaller than the sum total of the total of the tolerances of respective parts and the total of the sizes of gaps between the respective parts (the maximum value). JP2015-218819A discloses a method of assembling the damper including: a step of stacking a sheet, a rod guide assembly, and a seal member, in this order, on the upper side of a retaining ring provided in an inner circumference of the cylinder and a step of caulking an upper end portion of the cylinder towards inside. In addition, JP2015-218819A discloses that a hooking groove 30f at which a retaining ring 14 comes into contact with a sheet 30 is provided, and the distance from a bottom portion of the hooking groove 30f to an end surface of an outer circumferential portion 30b on the side of an operation chamber L is shorter than the diameter of the cross-section of the retaining ring 14.

However, in the technique described in JP2015-218819A, the distance from the bottom portion of the hooking groove 30f in contact with the retaining ring 14 to the end surface of the outer circumferential portion 30b on the side of the operation chamber L is shorter than the sum total of the total of the tolerances of the respective parts and the total of the sizes of the gaps between the respective parts (the maximum value). Therefore, in the technique described in JP2015-218819A, the difference between the projected margin X of the cylinder end portion when the sheet 30 is arranged in the correct orientation and the projected margin X of the cylinder end portion when the sheet 30 is arranged on the retaining ring 14 in the incorrect orientation is small, and therefore, it is not possible to perform determination of the misassembly of the sheet 30. In other words, in the technique described in JP2015-218819A, there is a risk in that it is not possible to determine whether the difference between the projected margin X when the sheet 30 is arranged in the correct orientation and the projected margin X when the sheet 30 is arranged in the incorrect orientation is caused by the influence of the tolerance and/or the gaps between the parts or the difference is caused by the misassembly. Therefore, with the damper described in JP2015-218819A, when the sheet, the rod guide assembly, and the seal member are stacked, there is a risk in that the misassembly in which the respective parts are assembled to the cylinder in the inverted orientation by mistake is caused.

If a projecting height H1, that is the axial length of the protruded portions 110, is shorter than the sum total of the total of the tolerances of the respective parts to be stacked and the total of the sizes of the gaps between the respective parts stacked (the maximum value), it becomes difficult to perform the determination of the misassembly. Therefore, in order to able to perform the determination of the misassembly, it is preferable that, as shown in FIG. 8, the projecting height H1 of the protruded portions 110 be set such that the tip end surfaces 110a thereof are positioned below the lower end of the retaining ring 109. In addition, it is more preferable that the projecting height H1 of the protruded portions 110 be set to the dimension larger than the diameter of the cross-section of the retaining ring 109. For example, the projecting height H1 of the protruded portions 110 is set to the dimension equal to or longer than 1 mm. By doing so, between the case in which the bearing unit 140 is arranged in the correct orientation and the case in which the bearing unit 140 is arranged in the incorrect orientation, it is possible to change the projected margin X by an amount equal to or greater than the sum total of the total of the tolerances of the respective parts to be stacked and the total of the sizes of the gaps between the respective parts (the maximum value), and therefore, it is possible to perform the determination of the misassembly with ease.

Figure 10:
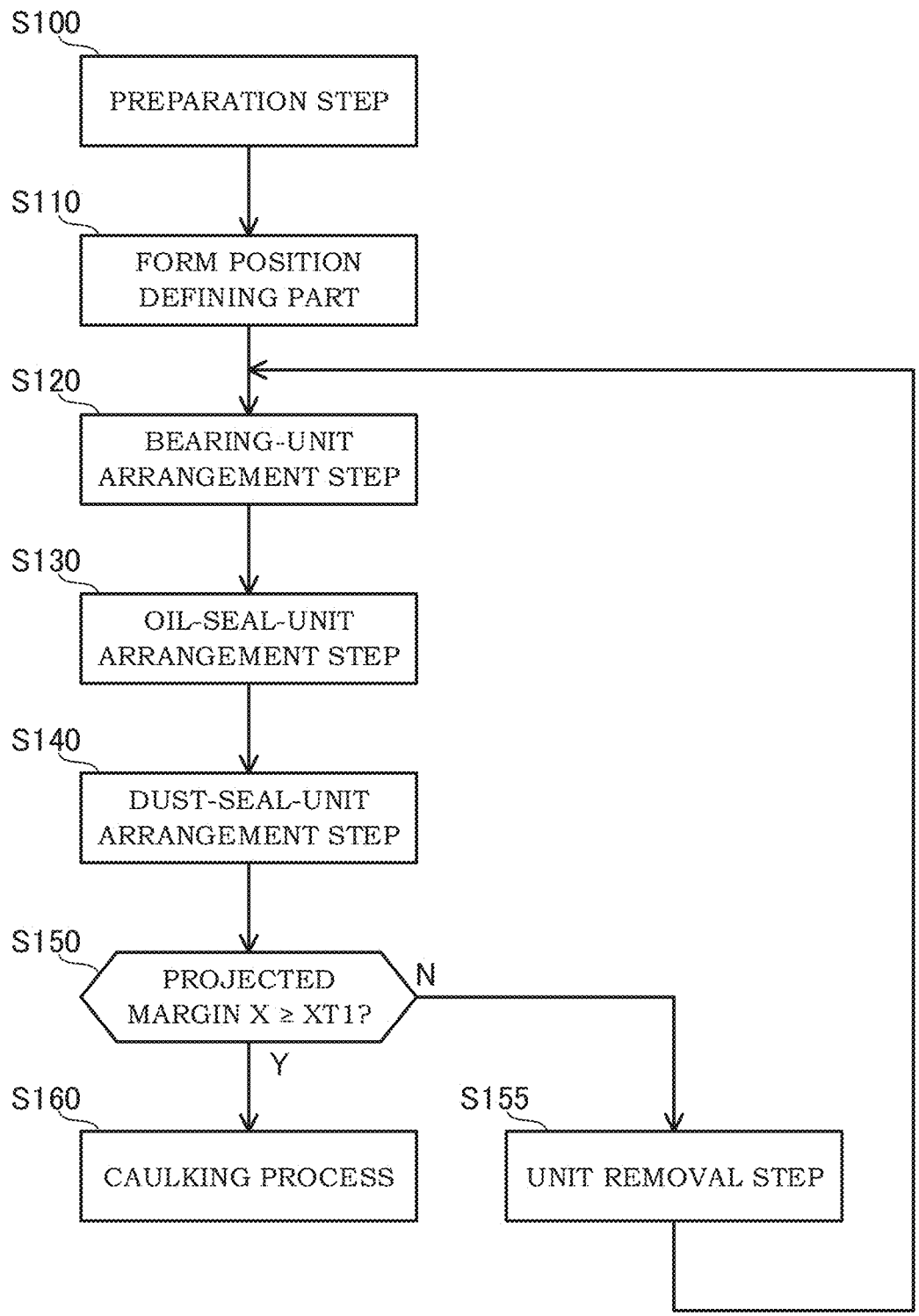
FIG. 10 is a flowchart showing an assembly procedure of the rod guide assembly of the shock absorber.

A method of assembling the rod guide assembly 100B of the shock absorber 10B according to the third embodiment will be described. FIG. 10 is a flowchart showing an assembly procedure of the rod guide assembly 100B of the shock absorber 10B. As shown in FIG. 10, the method of assembling the rod guide assembly 100B includes a preparation step S100, a position-defining-part forming step S110, a bearing-unit arrangement step S120, an oil-seal-unit arrangement step S130, a dust-seal-unit arrangement step S140, a misassembly-determination step S150, and a caulking-process step S160.

In the preparation step S100, the respective parts forming the rod guide assembly 100B are prepared. The bush 142 is press-fitted into the through hole 160 of the rod guide 141 to form the bearing unit 140. The oil seal 132 is inserted into the seal accommodating concave portion 134 of the seal housing 131, and subsequently, the seal holder 133 is inserted to form the oil seal unit 130. The insert member 121 is covered with the rubber member having the dust seal 122 and the outer circumferential seal 123 to form the dust seal unit 120.

In the position-defining-part forming step S110, the retaining ring 109 is fitted into the groove 1c that is formed in the inner circumference of the cylinder 1 so as to extend along the circumferential direction.

The bearing-unit arrangement step S120 is performed after the position-defining-part forming step S110. In the bearing-unit arrangement step S120, the bearing unit 140 is inserted inside the cylinder 1 from the upper opening portion of the cylinder 1 such that the bearing unit 140 is placed on the retaining ring 109.

The oil-seal-unit arrangement step S130 is performed after the bearing-unit arrangement step S120. In the oil-seal-unit arrangement step S130, the oil seal unit 130 is inserted inside the cylinder 1 from the upper opening portion of the cylinder 1 such that the oil seal unit 130 is placed on the bearing unit 140.

The dust-seal-unit arrangement step S140 is performed after the oil-seal-unit arrangement step S130. In the dust-seal-unit arrangement step S140, the dust seal unit 120 is inserted inside the cylinder 1 from the upper opening portion of the cylinder 1 so as to be placed on the oil seal unit 130.

The misassembly-determination step S150 is performed after the dust-seal-unit arrangement step S140. In the misassembly-determination step S150, as shown in FIGS. 8 and 9, the projected margin X from the upper end of the insert member 121 of the dust seal unit 120 to the upper end of the cylinder 1 is measured, and it is judged whether or not thus-measured projected margin X is equal to or greater than a predetermined threshold value Xt1. The threshold value Xt1 is set to judge whether or not the bearing unit 140 is arranged in the correct orientation.

As shown in FIG. 8, in a case in which the bearing unit 140 is assembled in the cylinder 1 in the correct orientation, the flat end surface of the contact portion 143 comes into contact with the seal housing 131. At this time, the distance from the contacting portion P0 between the retaining ring 109 and the outer corner portion 148a of the rod guide 141 to a contact plane between the contact portion 143 and the seal housing 131 is L0.

An outer corner portion 148b of the rod guide 141 on the front surface 141f side has a similar shape as the outer corner portion 148a of the rod guide 141 on the back surface 141b side. Therefore, as shown in FIG. 9, in a case the bearing unit 140 is assembled in the cylinder 1 in the incorrect orientation, the outer corner portion 148b is brought into contact with the retaining ring 109, and the position of the bearing unit 140 in the axial direction is defined by the retaining ring 109. At this time, a distance from a contacting portion P1 between the retaining ring 109 and the outer corner portion 148b of the rod guide 141 to the contact plane between the tip end surface 110a of the protruded portion 110 and the seal housing 131 is L1.

The distance L1 at which the bearing unit 140 is assembled inside the cylinder 1 in the incorrect orientation becomes longer than the distance L0 at which the bearing unit 140 is assembled inside the cylinder 1 in the correct orientation by the projecting height H1 of the protruded portions 110 (L1>L0, L1=L0+H1).

Therefore, a projected margin X1 in a case in which the bearing unit 140 has been assembled inside the cylinder 1 in the incorrect orientation becomes shorter than a projected margin X0 in a case in which the bearing unit 140 has been assembled inside the cylinder 1 in the correct orientation by the projecting height H1 of the protruded portions 110 (X1<X0, X1=X0−H1).

The above-described threshold value Xt1 is set to the value that is larger than X1 and smaller than X0 (X1<Xt1<X0). As shown in FIG. 10, in the misassembly-determination step S150, when the measured projected margin X is equal to or larger than the threshold value Xt1, it is determined that the bearing unit 140 is arranged in the correct orientation, and the process proceeds to the caulking-process step S160. In the misassembly-determination step S150, when the measured projected margin X is less than the threshold value Xt1, it is determined that the bearing unit 140 is arranged in the inverted orientation (the incorrect orientation), and the process proceeds to a unit removal step S155.

In the unit removal step S155, the dust seal unit 120, the oil seal unit 130, and the bearing unit 140 are removed from the cylinder 1, and the process returns to the bearing-unit arrangement step S120.

In the misassembly-determination step S150, when it is judged that the bearing unit 140 is arranged in the correct orientation, the upper end portion of the cylinder 1 is caulked towards the inside to form the caulked portion 1b in the caulking-process step S160. Thus, the rod guide assembly 100B is completed.

As described above, the protruded portions 110 have a function of making the projected margin X of the cylinder end portion (X=X0) in a case in which the bearing unit 140 has been arranged on the retaining ring 109 in the correct orientation different from the projected margin X of the cylinder end portion (X=X1) in a case in which the bearing unit 140 has been arranged on the retaining ring 109 in the incorrect orientation. Thus, in the misassembly-determination step S150, it is possible to determine the occurrence of the misassembly of the rod guide assembly 100B with ease.

Figure 11:
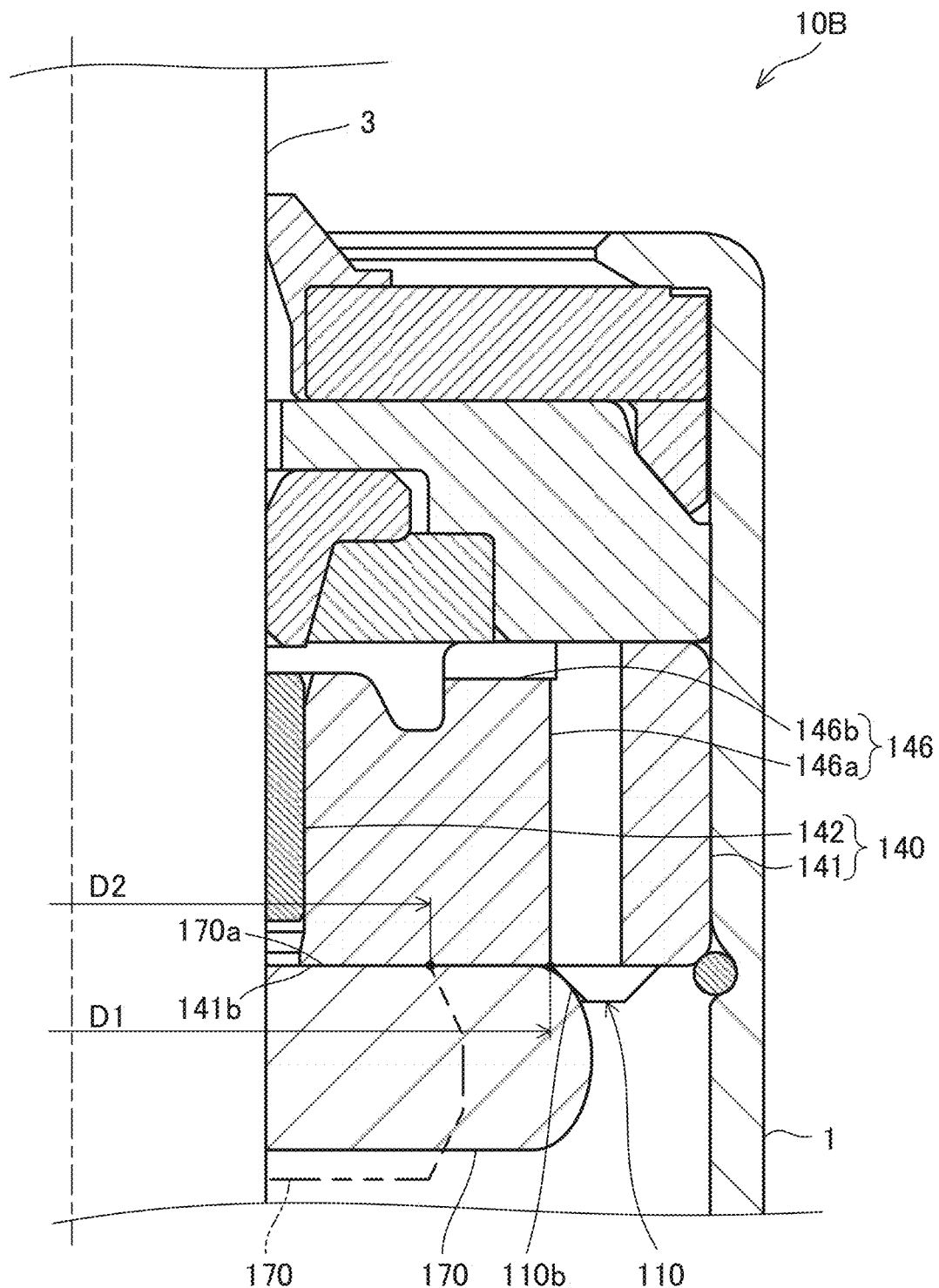
FIG. 11 is a sectional view showing a state in which the shock absorber according to the third embodiment of the present invention is extended to the utmost extent.

Addition to the above-described function, the protruded portions 110 have a function of improving a durability of the rebound cushion 170. FIG. 11 is a diagram showing a state in which the shock absorber 10B is extended to the utmost extent. As shown in FIG. 11, when the shock absorber 10B is extended to the utmost extent, an annular contact surface 170a that is an end surface facing the bearing unit 140 comes into contact with the back surface 141b of the rod guide 141, and thereby, the rebound cushion 170 is elastically deformed. An inner diameter D1 of base end portions of the protruded portions 110 is larger than an outer diameter D2 of the contact surface 170a of the rebound cushion 170 that has not been elastically deformed (D1>D2). Therefore, when the shock absorber 10B is in the most-extended state, the rebound cushion 170 is expanded in the radial direction, and thereby, it is possible to effectively alleviate the impact applied to the shock absorber 10B. Furthermore, when the shock absorber 10B is in the most-extended state, the rebound cushion 170 that has been elastically deformed and expanded in the radial direction comes into contact with the side surfaces 110b on the inner side of the protruded portions 110 at its outer circumference, and thereby, the radially outward deformation of the rebound cushion 170 is restricted. Because over deformation of the rebound cushion 170 can be prevented, it is possible to improve the durability of the rebound cushion 170.

As described above, because the protruded portions 110 have the shapes that extend along the circumferential direction (see FIG. 7), it is possible to uniformly suppress the deformation of the rebound cushion 170 in the radial direction. Therefore, it is possible to more effectively improve the durability of the rebound cushion 170. As described above, the side surfaces 110b on the inner side of the protruded portions 110 are formed to have the tapered surfaces. Therefore, a damage is not caused on the rebound cushion 170 by the contact with the side surfaces 110b on the inner side of the protruded portions 110.

As shown in FIG. 7, the aperture planes of the penetrating passages 146a on the extension-side chamber 61 side are respectively arranged between the protruded portions 110 adjacent to each other in the circumferential direction. In addition, the aperture planes of the penetrating passages 146a on the extension-side chamber 61 side are arranged radially outside of radially-inside edges 110i of the protruded portions 110. In the above, each of the aperture planes of the penetrating passages 146a on the extension-side chamber 61 side need not be arranged completely radially outside of the radially-inside edges 110i of the protruded portions 110. In other words, it suffices that a part of each the aperture planes of the penetrating passages 146a on the extension-side chamber 61 side is arranged radially outside of the radially-inside edges 110i of the protruded portions 110.

With such a configuration, as shown in FIG. 11, when the shock absorber 10B is extended to the utmost extent, it is possible to prevent opening portions of the penetrating passages 146a from being closed by the rebound cushion 170. Therefore, because it is possible to allow the pressure in the extension-side chamber 61 to be exerted to the oil seal 132 continuously, it is possible to maintain the seal performance achieved by the oil seal 132. In addition, the region in the back surface 141b of the rod guide 141 with which the end surface of the rebound cushion 170 in the axial direction comes into contact can be made to have a flat surface having no irregularities formed by the opening portions of the above-described penetrating passages 146a, etc. With such a configuration, it is possible to prevent the rebound cushion 170 from being damaged when the rebound cushion 170 is collided with the rod guide 141. Therefore, it is possible to improve the durability of the rebound cushion 170.

According to the third embodiment described above, following operational advantages are afforded in addition to the above-described operational advantages of the first embodiment.

As shown in FIG. 8, the rod guide 141 is formed such that, when the rod guide 141 is inserted into the cylinder 1 such that the front side and the back side are oriented in the correct orientation, the surface (the front surface 141f) on the other side of the surface on which the protruded portions 110 are provided (the back surface 141b) comes into contact with the seal housing 131. And as shown in FIG. 9, when the rod guide 141 is inserted into the cylinder 1 such that the front side and the back side are oriented in the incorrect orientation that is the orientation inverted from the correct orientation, the tip end surfaces 110a of the protruded portions 110 come into contact with the seal housing 131.

According to the above-described configuration, it is possible to make the projected margin X of the cylinder end portion (X=X0) in a case in which the bearing unit 140 has been arranged on the retaining ring 109 in the correct orientation different from the projected margin X of the cylinder end portion (X=X1) in a case in which the bearing unit 140 has been arranged on the retaining ring 109 in the incorrect orientation. Thus, it is possible to perform the determination of the misassembly with ease, and so, it is possible to prevent occurrence of the misassembly. As a result, it is possible to prevent leakage of the oil due to the misassembly.

<Fourth Embodiment>

Figure 12:
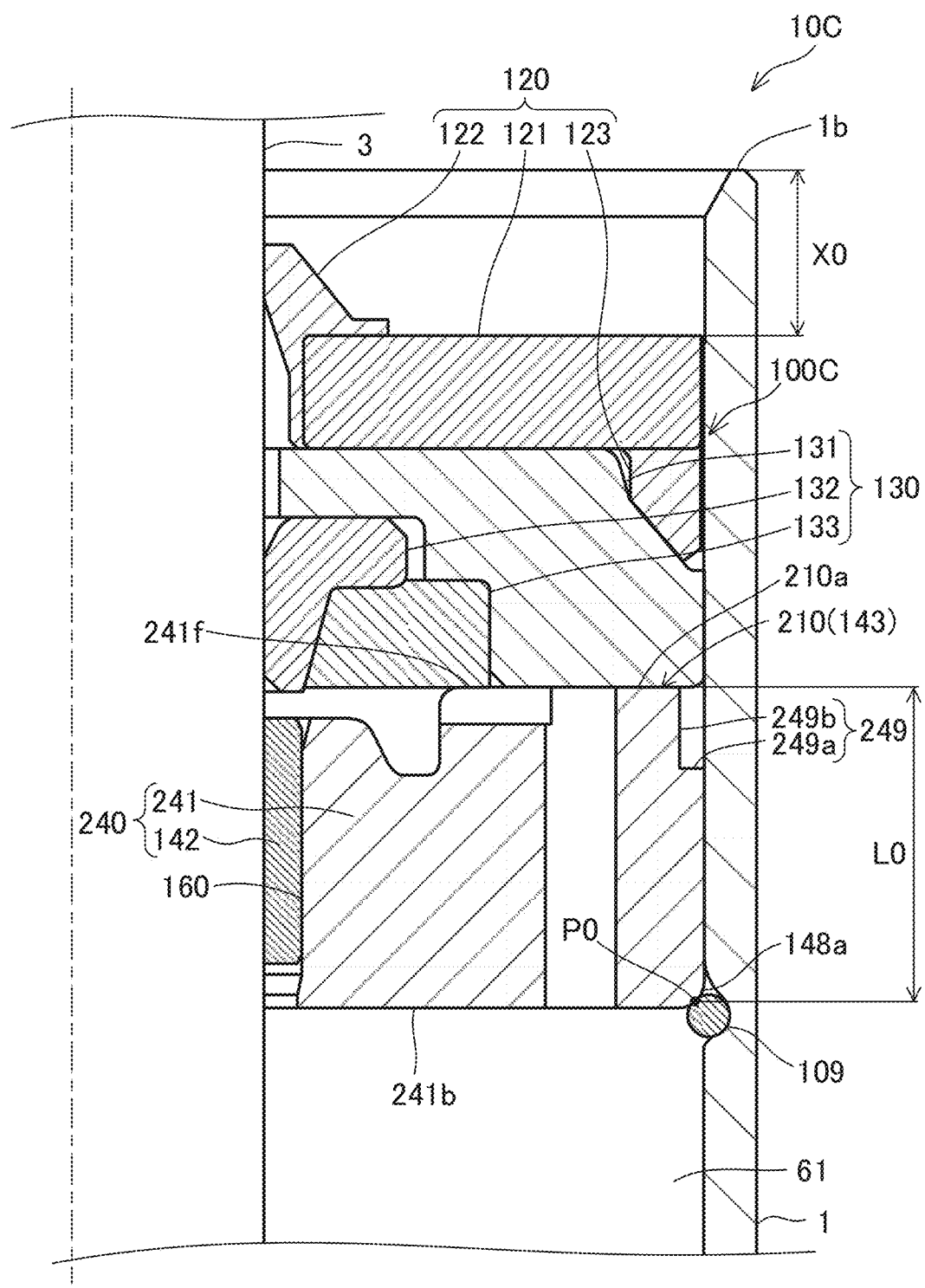
FIG. 12 is a sectional view showing a state in which a bearing unit in the shock absorber according to a fourth embodiment of the present invention is arranged in a correct orientation.

A shock absorber 10C according to a fourth embodiment of the present invention will be described with reference to FIGS. 12 and 13. In the following, differences from the above-described third embodiment will be mainly described, and in the figures, components that are the same as or correspond to the components described in the above-described third embodiment are assigned the same reference numerals and description thereof will be omitted. FIG. 12 is a sectional view showing a state in which a bearing unit 240 in the shock absorber 10C is arranged in the correct orientation, and FIG. 13 is a sectional view showing a state in which the bearing unit 240 in the shock absorber 10C is arranged in the incorrect orientation.

In the above-described third embodiment, a description has been given of an example in which, by providing the protruded portions 110, the projected margin X (X=X0) in a case which the rod guide 141 has been arranged in the correct orientation is made different from the projected margin X (X=X1) in a case in which the rod guide 141 has been arranged in the incorrect orientation. In contrast, in this fourth embodiment, instead of forming the protruded portions 110 on the rod guide 141, a step portion 249 is formed in a rod guide 241.

The step portion 249 is formed in an outer circumferential portion of a front surface 241f of the rod guide 241 so as to extend over the entire circumference of the rod guide 241. The step portion 249 has a side surface 249b in parallel with the axial direction and a bottom surface 249a orthogonal to the axial direction.

Figure 13:
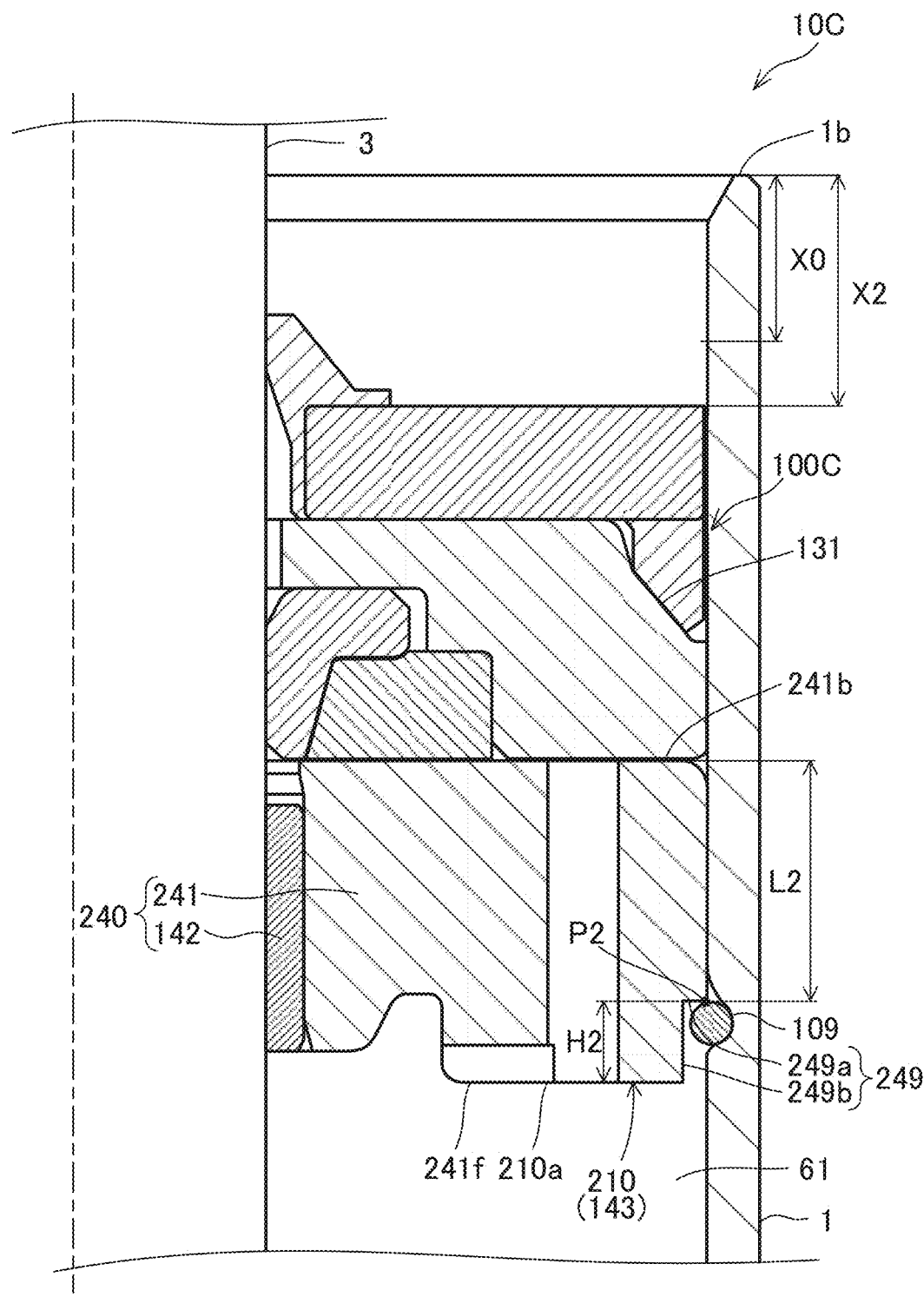
FIG. 13 is a sectional view showing a state in which the bearing unit in the shock absorber according to the fourth embodiment of the present invention is arranged in the incorrect orientation.

As shown in FIG. 13, the step portion 249 is formed such that the bottom surface 249a thereof comes into contact with the retaining ring 109 when the rod guide 241 is arranged in the incorrect orientation. In this fourth embodiment, by forming the step portion 249, the contact portion 143, which is formed radially inside of the step portion 249, is formed as a protruded portion 210.

In other words, as shown in FIG. 13, when the rod guide 241 according to this fourth embodiment is inserted into the cylinder 1 such that the front side and the back side of the rod guide 241 are oriented in the incorrect orientation, the surface (a back surface 241b) on the other side of the surface on which the protruded portion 210 is formed (the front surface 241f) comes into contact with the seal housing 131. In addition, as shown in FIG. 12, when the rod guide 241 is inserted into the cylinder 1 such that the front side and the back side of the rod guide 241 are oriented correctly, a tip end surface 210a of the protruded portion 210 comes into contact with the seal housing 131.

As shown in FIG. 13, the protruded portion 210 is provided so as to be positioned radially inside (the center side) of a contacting portion P2 that comes into contact with the retaining ring 109 when the rod guide 241 is inserted into the cylinder 1 in the incorrect orientation. A projecting height H2 of the protruded portion 210 is set such that the tip end surface 210a thereof is positioned below the lower end of the retaining ring 109.

As shown in FIG. 12, when the bearing unit 240 is assembled in the cylinder 1 in the correct orientation, the flat end surface of the contact portion 143 comes into contact with the seal housing 131. At this time, the distance from the contacting portion P0 between the retaining ring 109 and the outer corner portion 148a of the rod guide 141 to the contact plane between the contact portion 143 and the seal housing 131 is L0.

On the other hand, as shown in FIG. 13, when the bearing unit 240 is assembled in the cylinder 1 in the incorrect orientation, the back surface 241b, which would come into contact with the rebound cushion 170 under a normal condition, comes to contact with the seal housing 131.

As described above, the step portion 249 is formed in the outer circumferential portion of the rod guide 241 on the front surface 241f side. Therefore, when the bearing unit 240 is assembled in the cylinder 1 in the incorrect orientation, the bottom surface 249a of the step portion 249 comes into contact with the retaining ring 109, and thereby, the bearing unit 240 is supported. The distance from the contacting portion P2 between the retaining ring 109 and the step portion 249 of the rod guide 241 to the contact plane between the back surface 241b of the rod guide 241 and the seal housing 131 is L2.

The distance L2 in a case in which the bearing unit 240 is assembled inside the cylinder 1 in the incorrect orientation becomes shorter than the distance L0 in a case in which the bearing unit 240 is assembled inside the cylinder 1 in the correct orientation (L2<L0).

Therefore, a projected margin X2 in a case in which the bearing unit 240 is assembled inside the cylinder 1 in the incorrect orientation becomes longer than the projected margin X0 in a case in which the bearing unit 240 is assembled inside the cylinder 1 in the correct orientation (X2>X0).

The assembly procedure of a rod guide assembly 100C according to this fourth embodiment is similar to the assembly procedure of the rod guide assembly 100B according to the above-described third embodiment. However, the misassembly-determination step is performed as following.

In this fourth embodiment, in the misassembly-determination step, it is judged whether or not the measured projected margin X is less than a predetermined threshold value Xt2. The threshold value Xt2 is set to judge whether or not the bearing unit 240 is arranged in the correct orientation. The threshold value Xt2 is set to the value that is larger than X0 and smaller than X2 (X0<Xt2<X2).

In the misassembly-determination step, when the measured projected margin X is less than the threshold value Xt2, it is determined that the bearing unit 240 is arranged in the correct orientation, and the process proceeds to the caulking-process step S160. In the misassembly-determination step, when the measured projected margin X is equal to or greater than the threshold value Xt2, it is determined that the bearing unit 240 is arranged in the inverted orientation (the incorrect orientation), and the process proceeds to the unit removal step S155.

According to the fourth embodiment described above, similarly to the above-described third embodiment, it is possible to make the projected margin X of the cylinder end portion (X=X0) in a case in which the bearing unit 240 has been arranged on the retaining ring 109 in the correct orientation different from the projected margin X of the cylinder end portion (X=X2) in a case in which the bearing unit 240 has been arranged on the retaining ring 109 in the incorrect orientation. Thus, it is possible to perform the determination of the misassembly with ease, and so, it is possible to prevent occurrence of the misassembly. As a result, it is possible to prevent leakage of the oil due to the misassembly.

Following modifications are also within the scope of the present invention, and it is also possible to combine the configurations shown in the modifications with the configurations described in the above-described embodiments, to combine the configurations described in the different embodiments described above, and to combine the configurations described in the different modifications described below.

<First Modification>

Figure 14:
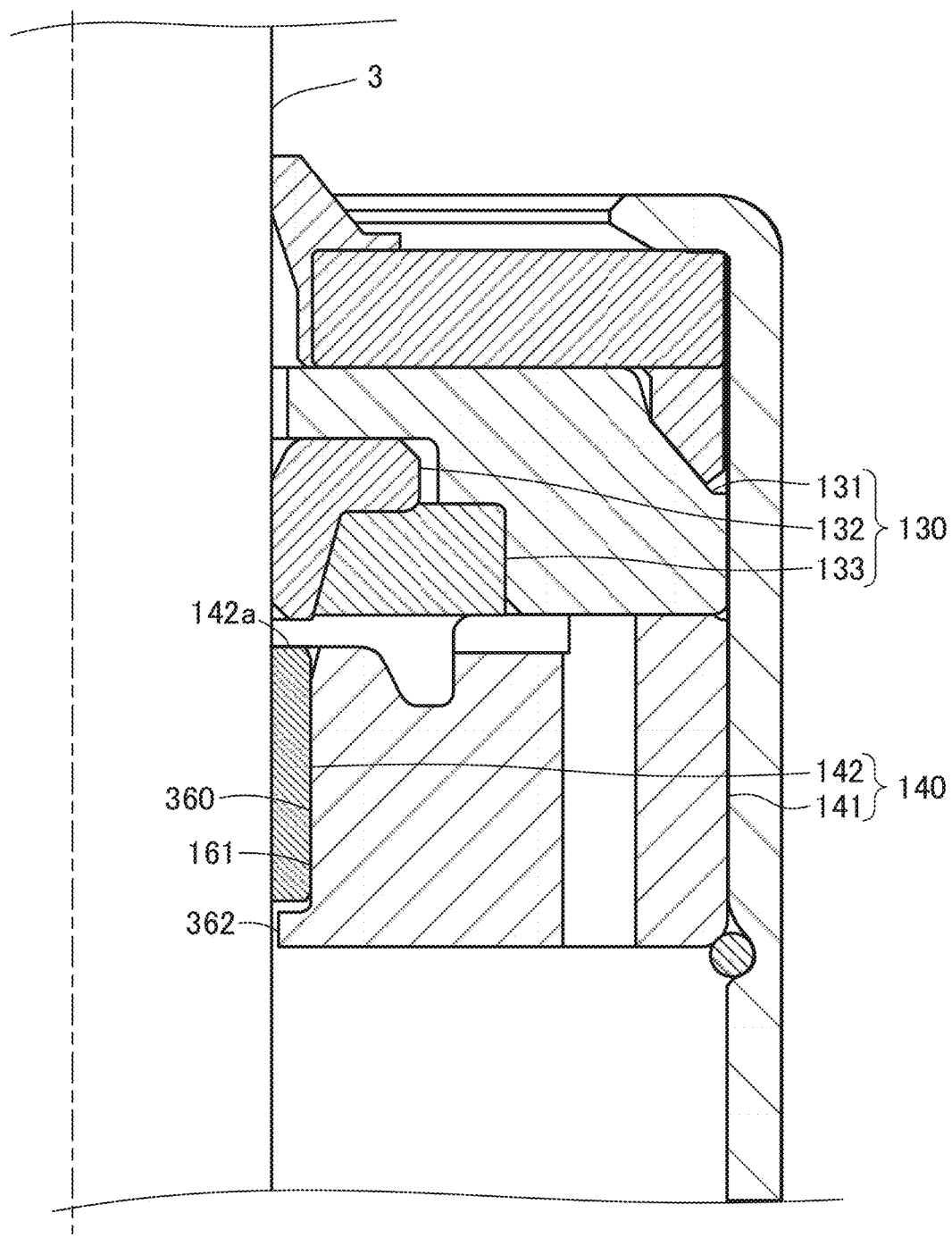
FIG. 14 is an enlarged sectional view showing the rod guide assembly in the shock absorber according to a modification of the embodiments of the present invention.

The shape of the through hole 160 of the rod guide 141 is not limited to the shape described in the above-described embodiments. For example, as shown in FIG. 14, a small-diameter portion 362 may be formed in a through hole 360 such that the distance between an inner circumferential surface of the small-diameter portion 362 and the outer circumferential surface of the rod 3 is minimized as much as possible. In this first modification, a step surface orthogonal to the center axis of the rod 3 is formed between the large-diameter portion 161 and the small-diameter portion 362. As described above, by forming the small-diameter portion 362 so as to project out radially inward from the lower end of the large-diameter portion 161, it is possible to improve the durability of the rod guide 141 more than in the first embodiment. In addition, in the first embodiment, the small-diameter portion 162 of the through hole 160 may be omitted, if the distance between the lower aperture plane 160b of the through hole 160 and the lower end surface 142b of the bush 142 shown in FIG. 3 can be ensured sufficiently.

<Second Modification>

The present invention may also be applied to the shock absorber 10 that is not provided with the rebound cushion 170. In such a case, the axial length of the bush 142 may be set longer such that the lower end surface 142b of the bush 142 matches the lower aperture plane 160b of the through hole 160. It suffices that, at least, the bush 142 is arranged such that the upper end surface 142a of the bush 142 matches the upper aperture plane 160a of the through hole 160 of the rod guide 141 or so as to project out from the upper aperture plane 160a of the through hole 160.

<Third Modification>

Figure 15:
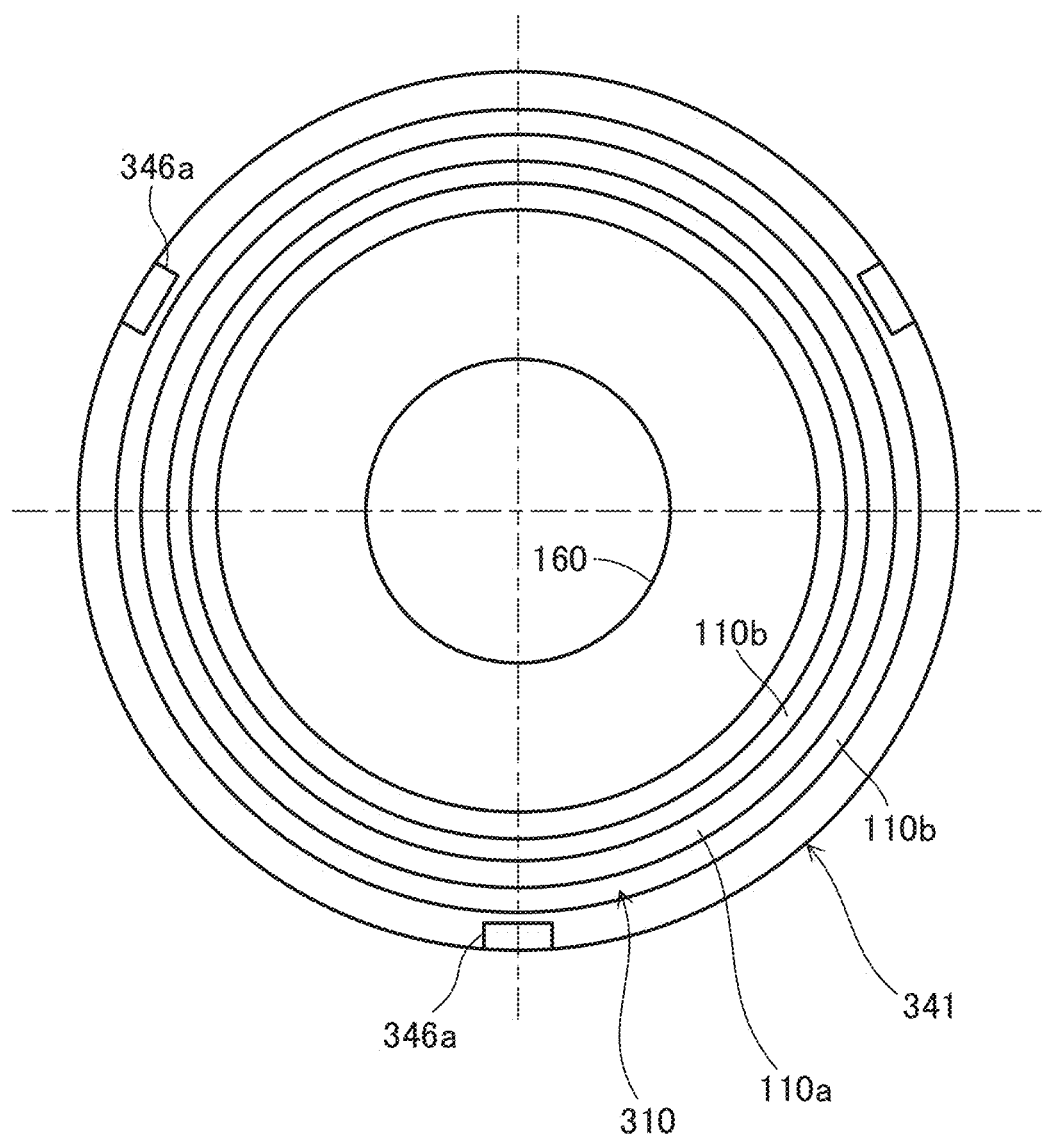
FIG. 15 is a rear view of the rod guide in the shock absorber according to another modification of the embodiments of the present invention.

In the above-described third embodiment, although a description has been given of an example in which the plurality of protruded portions 110 are provided on the rod guide 141 along the circumferential direction at a predetermined intervals (see FIG. 7), the present invention is not limited thereto. For example, as shown in FIG. 15, a single annular-shaped protruded portion 310 may be provided on a rod guide 341. In addition, in this third modification, instead of the penetrating passages 146a described in the third embodiment, grooves 346a are provided on an outer circumference of the rod guide 341 so as to extend in the axial direction. The grooves 346a form a communicating passage that communicates with the radial direction passages 146b and guides the working oil in the extension-side chamber 61 to the oil chamber 151. In such a modification, the similar effects as those described in the above-described third embodiment are afforded.

<Fourth Modification>

In the above-described third embodiment, although a description has been given of an example in which the protruded portions 110 have the trapezoidal cross-section, the present invention is not limited thereto. For example, the cross-section of the protruded portions 110 may be a semicircular shape. In addition, a plurality of hemispherical protruded portions may be provided.

<Fifth Modification>

Figure 16:
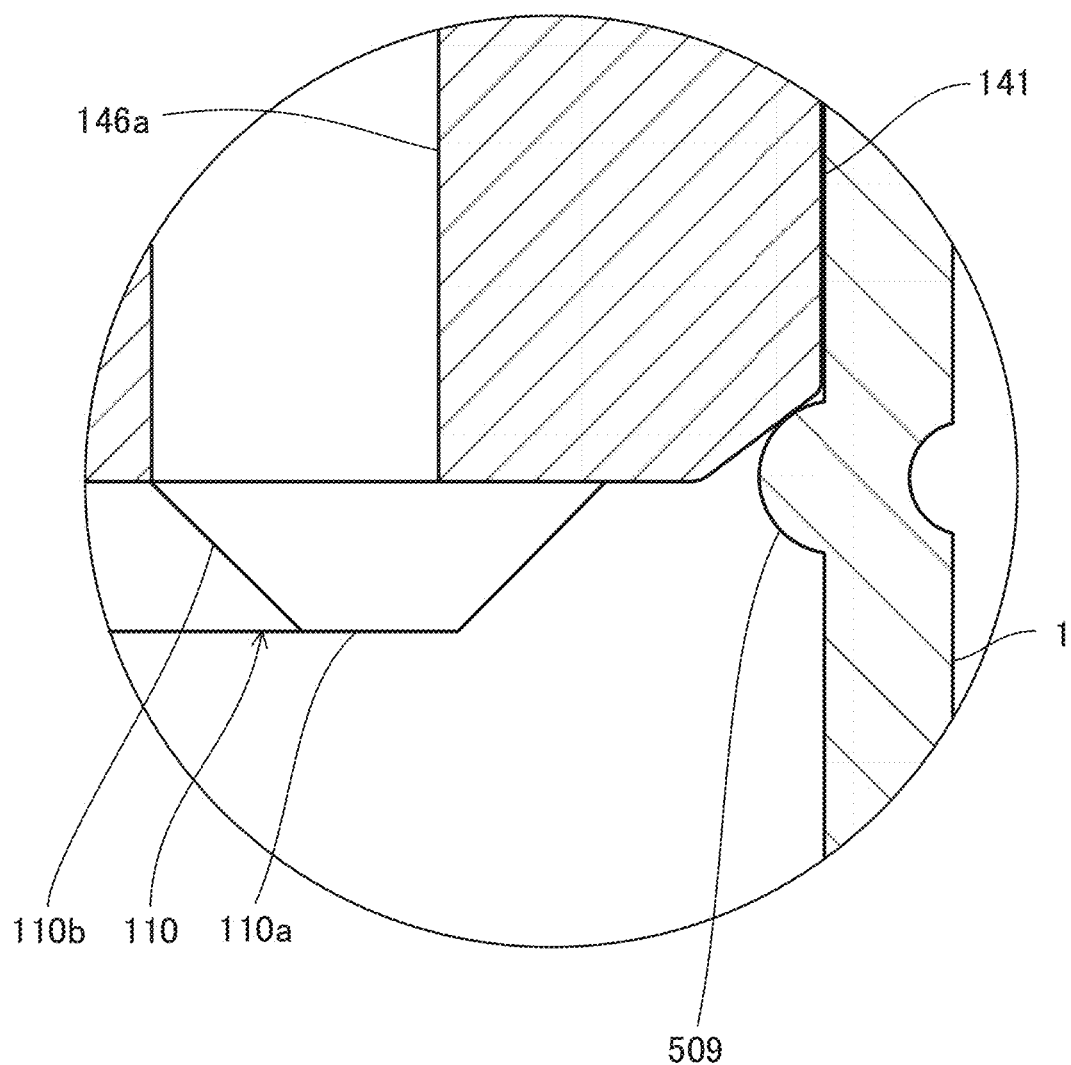
FIG. 16 is an enlarged sectional view of an outer corner portion of the rod guide that engages with a supporting protrusion of a cylinder in the shock absorber according to a further modification of the embodiments of the present invention.

In the above-described embodiments, although a description has been given of an example in which the retaining ring 109 functions as the position defining part that defines the position of the rod guide 141, 241 in the axial direction, the present invention is not limited thereto. For example, as shown in FIG. 16, a supporting protrusion 509 serving as the position defining part may also be formed by making a part of the cylinder 1 having the cylindrical shape to be projected inwardly by performing a roll caulking. The supporting protrusion 509 may be formed to have, for example, a semicircular cross-section. The supporting protrusion 509 may be formed over the entire circumference of the cylinder 1, or a supporting protrusions 509 may be formed along the circumferential direction at equal intervals.

<Sixth Modification>

In the above-described embodiments, although descriptions have been given of the mono-tube shock absorber 10, 10A, 10B, 10C as examples, the present invention is not limited thereto. The present invention may also be applied to a twin-tube shock absorber in which a gas chamber is formed in a gap between two cylinders, a shock absorber provided with a tank serving as the gas chamber at the outside of the cylinder, and so forth.

<Seventh Modification>

In the above-described embodiment, although a description has been given of an example in which the working oil is used as the working fluid filled in the cylinder 1, the present invention is not limited thereto. Various working fluid such as water, etc. may be employed.

The configurations, operations, and effects of the embodiments of the present invention will be collectively described below. The components in parentheses are examples.

The shock absorber 10, 10A, 10B, 10C comprises the cylinder 1, the piston 2, the piston rod 3, the bearing unit 140, the bearing (the bush 142), the seal unit (the oil seal unit 130), and the pressure chamber (the oil chamber 151). The cylinder 1 is filled with the working fluid. The piston 2 is configured to provide in the cylinder 1 in a freely slidable manner. The piston 2 is configured to partition the interior of the cylinder 1 into the extension-side chamber 61 and the contraction-side chamber 62. The piston rod 3 is inserted into the cylinder 1 so as to be able to move into and out of the cylinder 1. The piston rod 3 is connected to the piston 2. The bearing unit 140 has a bearing (the bush 142) and the bearing holding member (the rod guide 141) provided with the through hole 160 into which the bearing (the bush 142) is inserted. The bearing (the bush 142) is configured such that the piston rod 3 is brought into sliding contact with the inner circumference of the bearing (the bush 142). The seal unit (the oil seal unit 130) has the seal member (the oil seal 132) configured to prevent leakage of the working fluid by being brought into sliding contact with the outer circumference of the piston rod 3, and the seal holding member (the seal housing 131) configured to hold the seal member (the oil seal 132). And the pressure chamber (the oil chamber 151) is provided between the seal unit (the oil seal unit 130) and the bearing unit 140. The bearing holding member (the rod guide 141) is provided with the communicating passage 146, the communicating passage 146 being configured to guide the working fluid in the extension-side chamber 61 to the pressure chamber (the oil chamber 151). The seal holding member (the seal housing 131) has the seal accommodating portion (the seal accommodating concave portion 134) configured to accommodate the seal member (the oil seal 132); and the insertion hole 138 through which the piston rod 3 is inserted. The seal member (the oil seal 132) is pressed against the outer circumferential surface of the piston rod 3 and the seal accommodating portion (the seal accommodating concave portion 134) by the working-fluid pressure in the extension-side chamber 61 guided to the pressure chamber (the oil chamber 151). The bearing (the bush 142) is provided such that the first end surface (the upper end surface 142a) of the bearing (the bush 142) facing the seal member (the oil seal 132) matches the aperture plane (the upper aperture plane 160a) of the through hole 160 of the bearing holding member (the rod guide 141). Alternatively, the bearing (the bush 142) is provided such that the first end surface (the upper end surface 142a) of the bearing (the bush 142) facing the seal member (the oil seal 132) projects out from the aperture plane (the upper aperture plane 160a) of the through hole 160 of the bearing holding member (the rod guide 141).

According to the above-described configuration, the bearing (the bush 142) is provided such that the first end surface (the upper end surface 142a) of the bearing (the bush 142) matches the aperture plane (the upper aperture plane 160a) of the through hole 160 of the bearing holding member (the rod guide 141) or such that the first end surface (the upper end surface 142a) projects out from the aperture plane (the upper aperture plane 160a) of the through hole 160, and therefore, the gap is not formed between the bearing holding member (the rod guide 141) and the piston rod 3 on the side of the first end surface (the upper end surface 142a) of the bearing (the bush 142). Therefore, the accumulation of the extraneous matters between the bearing (the bush 142) and the seal member (the oil seal 132) is suppressed. Therefore, it is possible to prevent the seal member (the oil seal 132) from being damaged by the contact between the seal member (the oil seal 132) and the extraneous matters that have been accumulated between the bearing (the bush 142) and the seal member (the oil seal 132). Furthermore, because the deflection of the piston rod 3 about a one end (the upper end B1, B2) of the bearing (the bush 142) as the fixed fulcrum is suppressed, it is possible to set the gap 139 between the seal holding member (the seal housing 131) and the piston rod 3 so as to be smaller. By doing so, it is possible to prevent the damage of the seal member (the oil seal 132)

caused by the entry of the seal member (the oil seal 132) into the gap 139 between the seal holding member (the seal housing 131) and the piston rod 3.

The shock absorber 10, 10A, 10B, 10C is further provided with the elastically deformable rebound cushion 170. The elastically deformable rebound cushion 170 is provided on the outer circumference of the piston rod 3. The rebound cushion 170 is configured to come into contact with the bearing holding member (the rod guide 141) when the piston rod 3 is in the most-extended state. And the second end surface (the lower end surface 142b) of the bush 142 is positioned inside the through hole 160 in the axial direction.

According to the above-described configuration, it is possible to prevent the bearing (the bush 142) from being pushed towards the seal member (the oil seal 132) by the contact between the rebound cushion 170 and the bearing (the bush 142) when the piston rod 3 is in the most-extended state.

In the shock absorber 10, 10A, 10B, 10C, the through hole 160 has the large-diameter portion 161 and the small-diameter portion 162, 362. The large-diameter portion 161 is configured into which the bearing (the bush 142) is inserted. And the small-diameter portion 162, 362 are provided on the rebound cushion 170 side relative to the large-diameter portion 161, and the small-diameter portion 162, 362 have the inner diameter smaller than the inner diameter of the large-diameter portion 161.

According to the above-described configuration, the small-diameter portion 162, 362 prevents the bearing (the bush 142) from slipping out from the through hole 160, and so, it is possible to more effectively prevent the rebound cushion 170 from coming into contact with the bearing (the bush 142) by the small-diameter portion 162, 362.

In the shock absorber 10, 10A, 10B, 10C, the seal holding member (the seal housing 131) has the support portion 137 configured to support the seal member (the oil seal 132) in the axial direction, and the insertion hole 138 is formed in the support portion 137.

According to the above-described configuration, because the seal member (the oil seal 132) is supported by the support portion 137 in the axial direction, and so, the displacement of the seal member (the oil seal 132) being pressed against the piston rod 3 can be prevented, it is possible to improve the seal performance of the shock absorber 10, 10A, 10B, 10C. Furthermore, the bearing (the bush 142) is provided such that the first end surface (the upper end surface 142a) thereof matches the aperture plane (the upper aperture plane 160a) of the through hole 160 of the bearing holding member (the rod guide 141) or such that the first end surface (the upper end surface 142a) projects out from the aperture plane (the upper aperture plane 160a) of the through hole 160, and therefore, it is possible to allow the first end surface (the upper end surface 142a) of the bearing (the bush 142) to be positioned closer to the gap 139 between the outer circumferential surface of the piston rod 3 and the inner circumferential surface of the insertion hole 138. With such a configuration, because, even when the piston rod 3 is deflected about the one end (the upper end B1, B2) of the bearing (the bush 142) as the fixed fulcrum, the deflected amount of the piston rod 3 at the above-described gap 139 is suppressed, it is possible to set the above-described gap 139 so as to be smaller. By setting the gap 139 between the outer circumferential surface of the piston rod 3 and the inner circumferential surface of the insertion hole 138 formed in the support portion 137 that supports the seal member (the oil seal 132) so as to be smaller, it is possible to prevent the damage of the seal member (the oil seal 132) caused by the entry of the seal member (the oil seal 132) into the gap 139.

In the shock absorber 10B, 10C, the bearing unit 140, 240 is the support member configured to support the seal unit (the oil seal unit 130). And the shock absorber 10B, 10C further comprises the position defining part (the retaining ring 109, the supporting protrusion 509), and the caulked portion 1b. The position defining part (the retaining ring 109, the supporting protrusion 509) are provided on the inner circumference of the cylinder 1. The position defining part (the retaining ring 109, the supporting protrusion 509) are configured to define the position of the support member (the bearing unit 140, 240) in the axial direction. And the caulked portion 1b is formed on the end portion of the cylinder 1. The caulked portion 1b is configured to fix the support member (the bearing unit 140, 240) and the seal unit (the oil seal unit 130) in a stacked state between the caulked portion 1b and the position defining part (the retaining ring 109, the supporting protrusion 509). The support member (the bearing unit 140, 240) has the protruded portion 110, 210, 310 configured to project out towards the extension-side chamber 61 side at the center side of the position coming into contact with the position defining part (the retaining ring 109, the supporting protrusion 509) when the support member (the bearing unit 140, 240) is inserted into the cylinder 1 such that the front side and the back side are oriented in a first orientation. When the support member (the bearing unit 140, 240) is inserted into the cylinder 1 such that the front side and the back side of the support member (the bearing unit 140, 240) are oriented in the first orientation, the surface of the support member (the bearing unit 140, 240) on the opposite side from the surface provided with the protruded portion 110, 210, 310 comes into contact with the seal holding member (the seal housing 131), and when the support member (the bearing unit 140, 240) is inserted into the cylinder 1 such that the front side and the back side of the support member (the bearing unit 140, 240) are oriented in a second orientation, the tip end portion of the protruded portion 110, 210, 310 comes into contact with the seal holding member (the seal housing 131), the second orientation being an orientation inverted from the first orientation.

According to the above-described configuration, the projected margin X of the cylinder end portion in a case in which the support member (the bearing unit 140, 240) is arranged on the position defining part (the retaining ring 109, the supporting protrusion 509) in the correct orientation can be made different from the projected margin X of the cylinder end portion in a case in which the support member (the bearing unit 140, 240) is arranged on the position defining part (the retaining ring 109, the supporting protrusion 509) in the incorrect orientation. Therefore, it is possible to perform the determination of the misassembly of the support member (the bearing unit 140, 240) with ease. Thus, the occurrence of the misassembly can be prevented, and therefore, it is possible to prevent the leakage of the oil due to the misassembly.

The shock absorber 10B further comprises the elastically deformable annular-shaped rebound cushion 170 and the protruded portion 110, 310. The elastically deformable annular-shaped rebound cushion 170 is provided on the outer circumference of the piston rod 3. The rebound cushion 170 has the contact surface 170a coming into contact with the support member (the bearing unit 140) when the shock absorber 10B is in the most-extended state. And the protruded portion 110, 310 comes into contact with the outer circumference of the rebound cushion 170 when the shock absorber 10B is in the most-extended state.

According to the above-described configuration, because the deformation of the rebound cushion 170 in the radial direction can be suppressed by the protruded portion 110, 310, it is possible to improve the durability of the rebound cushion 170.

In the shock absorber 10B, 10C, the position defining part is the annular-shaped retaining ring 109 provided separately from the cylinder 1. The retaining ring 109 has the circular-shaped cross-section, the inner circumference of the cylinder 1 is provided with the annular groove 1c to which the retaining ring 109 is fitted. And the projecting height H1, H2 that is the axial length of the protruded portion 110, 210, 310 is longer than the diameter of the cross-section of the retaining ring 109.

According to the above-described configuration, because the projecting height H1, H2 of the protruded portion 110, 210, 310 is longer than the diameter of the cross-section of the retaining ring 109, it is possible to perform the determination of the misassembly with further ease.

In the shock absorber 10B, the protruded portion 110, 310 is provided along the circumferential direction.

According to the above-described configuration, because the deformation of the rebound cushion 170 in the radial direction can be suppressed uniformly by the protruded portion 110, 310, it is possible to more effectively improve the durability of the rebound cushion 170.

In the shock absorber 10B, the inner diameter D1 of the base end portion of the protruded portion 110, 310 is larger than the outer diameter D2 of the contact surface 170a of the rebound cushion 170 that is not elastically deformed.

According to the above-described configuration, because the rebound cushion 170 is expanded in the radial direction when the shock absorber 10B is in the most-extended state, it is possible to effectively alleviate the impact applied to the shock absorber 10B.

In the shock absorber 10B, the support member (the bearing unit 140) is provided with the communicating passage 146 for transmitting the pressure in the extension-side chamber 61 to the seal member (the oil seal 132), and a part of opening portion of the communicating passage 146 on the extension-side chamber 61 side is arranged radially outside of the radially-inside edge 110i of the protruded portion 110, 310.

In the shock absorber 10B, the plurality of protruded portions 110 have the arc shape and are provided along the circumferential direction, and opening portions of the communicating passages 146 on the extension-side chamber 61 side are respectively arranged between adjacent protruded portions 110.

With the above-described configuration, it is possible to prevent the opening portions of the communicating passages 146 on the extension-side chamber 61 side from being closed by the rebound cushion 170. Thus, it is possible to allow the pressure in the extension-side chamber 61 to be exerted to the seal member (the oil seal 132) continuously, and therefore, it is possible to maintain the seal performance achieved by the seal member (the oil seal 132).

Embodiments of this invention were described above, but the above embodiments are merely examples of applications of this invention, and the technical scope of this invention is not limited to the specific constitutions of the above embodiments.

This application claims priority based on Japanese Patent Applications No. 2018-048219 and No. 2018-048220 filed with the Japan Patent Office on Mar. 15, 2018, the entire contents of which are incorporated into this specification.

The invention claimed is:

1. A shock absorber comprising:
    a cylinder filled with working fluid;
    a piston provided in the cylinder in a freely slidable manner, the piston being configured to partition an interior of the cylinder into an extension-side chamber and a contraction-side chamber;
    a piston rod inserted into the cylinder so as to be able to move into and out of the cylinder, the piston rod being connected to the piston;
    a bearing unit having a bearing and a bearing holding member having a through hole into which the bearing is inserted, the bearing being configured such that the piston rod is brought into sliding contact with an inner circumference of the bearing;
    a seal unit having a seal member configured to prevent leakage of the working fluid by being brought into sliding contact with an outer circumference of the piston rod and a seal holding member configured to hold the seal member;
    a pressure chamber provided between the seal unit and the bearing unit; and
    an elastically deformable rebound cushion provided on the outer circumference of the piston rod, the rebound cushion being configured to come into contact with the bearing holding member when the piston rod is in a most-extended state, wherein
    the bearing holding member has a communicating passage configured to guide the working fluid in the extension-side chamber to the pressure chamber,
    the seal holding member has:
        a seal accommodating portion configured to accommodate the seal member, and
        an insertion hole through which the piston rod is inserted,
    the seal member is pressed against an outer circumferential surface of the piston rod and the seal accommodating portion by working-fluid pressure in the extension-side chamber guided to the pressure chamber, and
    the bearing has a first end surface facing the seal member and a second end surface opposite to the first end surface, the bearing being provided such that a distance in an axial direction of the cylinder between the seal unit and the first surface of the bearing is equal to or less than a distance between the seal unit and an aperture plane that is orthogonal to the axial direction formed by one end of the through hole of the bearing holding member, the second end surface being located inside the through hole.

2. The shock absorber according to claim 1, wherein the through hole has:
    a large-diameter portion into which the bearing is inserted; and
    a small-diameter portion provided on the rebound cushion side relative to the large-diameter portion, the small-diameter portion having an inner diameter smaller than an inner diameter of the large-diameter portion.

3. The shock absorber according to claim 1, wherein the seal holding member has a support portion configured to support the seal member in the axial direction, and the insertion hole is formed in the support portion.

4. The shock absorber according to claim 1, wherein the shock absorber is a mono-tube shock absorber.

5. The shock absorber according to claim 1, wherein the communicating passage is provided in an area different from an area where the through hole is provided in the bearing holding member.

6. A shock absorber, comprising:
- a cylinder filled with working fluid;
- a piston provided in the cylinder in a freely slidable manner, the piston being configured to partition an interior of the cylinder into an extension-side chamber and a contraction-side chamber;
- a piston rod inserted into the cylinder so as to be able to move into and out of the cylinder, the piston rod being connected to the piston;
- a bearing unit having a bearing and a bearing holding member provided with a through hole into which the bearing is inserted, the bearing being configured such that the piston rod is brought into sliding contact with an inner circumference of the bearing;
- a seal unit having a seal member configured to prevent leakage of the working fluid by being brought into sliding contact with an outer circumference of the piston rod and a seal holding member configured to hold the seal member; and
- a pressure chamber provided between the seal unit and the bearing unit, wherein
the bearing holding member is provided with a communicating passage, the communicating passage being configured to guide the working fluid in the extension-side chamber to the pressure chamber,
the seal holding member has:
- a seal accommodating portion configured to accommodate the seal member, and
- an insertion hole through which the piston rod is inserted,
the seal member is pressed against an outer circumferential surface of the piston rod and the seal accommodating portion by working-fluid pressure in the extension-side chamber guided to the pressure chamber,
the bearing is provided such that a first end surface of the bearing facing the seal member matches an aperture plane of the through hole of the bearing holding member or such that the first end surface of the bearing projects out from the aperture plane of the through hole, and
the bearing unit is a support member configured to support the seal unit, the shock absorber further comprising:
- a position defining part provided on an inner circumference of the cylinder, the position defining part being configured to define a position of the support member in an axial direction of the cylinder; and
- a caulked portion formed on an end portion of the cylinder, the caulked portion being configured to fix the support member and the seal unit in a stacked state between the caulked portion and the position defining part, wherein
the support member has first and second surfaces opposite to each other in the axial direction, and includes a protruded portion on the first surface of the support member, the protruded portion being configured to project out towards the extension-side chamber at a position on the first surface closer to a center of the support member than is a position coming into contact with the position defining part when the support member is inserted into the cylinder in a first orientation such that the second surface of the support member is closer to the seal holding member than is the first surface of the support member,
when the support member is inserted into the cylinder in the first orientation, the second surface of the support member comes into contact with the seal holding member, and
when the support member is inserted into the cylinder in a second orientation such that the first surface of the support member is closer to the seal holding member than is the second surface of the support member, a tip end portion of the protruded portion comes into contact with the seal holding member.

7. The shock absorber according to claim 6, further comprising
an elastically deformable annularly-shaped rebound cushion provided on the outer circumference of the piston rod, the rebound cushion having a contact surface coming into contact with the support member when the shock absorber is in a most-extended state, wherein
the protruded portion comes into contact with an outer circumference of the rebound cushion when the shock absorber is in the most-extended state.

8. The shock absorber according to claim 6, wherein
the position defining part is an annularly-shaped retaining ring provided separately from the cylinder, the retaining ring having a circularly-shaped cross section,
an inner circumferential surface of the cylinder has an annular groove to which the retaining ring is fitted, and
an axial length of the protruded portion is longer than a diameter of the cross section of the retaining ring.

* * * * *